United States Patent
Jarvis et al.

(10) Patent No.: US 11,119,487 B2
(45) Date of Patent: Sep. 14, 2021

(54) AUTOMATED PREPARATION OF DELIVERIES IN DELIVERY VEHICLES USING AUTOMATED GUIDED VEHICLES

(71) Applicant: Staples, Inc., Framingham, MA (US)

(72) Inventors: Daniel Jarvis, Windermere, FL (US); Paolo Gerli Amador, Westborough, MA (US); Michael Bhaskaran, Sherborn, MA (US); Amit Kalra, Acton, MA (US)

(73) Assignee: Staples, Inc., Framingham, MA (US)

( * ) Notice: Subject to any disclaimer, the term of this patent is extended or adjusted under 35 U.S.C. 154(b) by 55 days.

(21) Appl. No.: 16/237,649

(22) Filed: Dec. 31, 2018

(65) Prior Publication Data

US 2020/0209865 A1    Jul. 2, 2020

(51) Int. Cl.
| | | |
|---|---|---|
| *B60P 3/00* | (2006.01) | |
| *G05D 1/02* | (2020.01) | |
| *G05B 15/02* | (2006.01) | |
| *G06Q 10/08* | (2012.01) | |
| *G01C 21/20* | (2006.01) | |

(52) U.S. Cl.
CPC ............ *G05D 1/0212* (2013.01); *B60P 3/007* (2013.01); *G01C 21/20* (2013.01); *G05B 15/02* (2013.01); *G06Q 10/08355* (2013.01)

(58) Field of Classification Search
CPC ....... G05D 1/0212; B60P 3/007; G01C 21/20; G05B 15/02; G06Q 10/08355
See application file for complete search history.

(56) References Cited

U.S. PATENT DOCUMENTS

| 3,450,276 A | 6/1969 | Ferrari |
| 3,474,877 A | 10/1969 | Wesener |
| 3,628,624 A | 12/1971 | Wesener |
| 3,970,840 A | 7/1976 | De Bruine |

(Continued)

FOREIGN PATENT DOCUMENTS

| CA | 1196712 A | 11/1985 |
| CA | 1210367 A | 8/1986 |

(Continued)

OTHER PUBLICATIONS

US 7,460,017 B2, 12/2008, Roeder et al. (withdrawn)

(Continued)

*Primary Examiner* — Hunter B Lonsberry
*Assistant Examiner* — Matthew J. Reda
(74) *Attorney, Agent, or Firm* — VLP Law Group LLP; Michel Bohn

(57) ABSTRACT

A system and method for automated preparation of deliveries in delivery vehicles using automated guided vehicles is described. In an example implementation, the method may determine a future delivery in a set of deliveries assigned to a delivery vehicle, the future delivery including a first item and determine a storage location in the delivery vehicle of the first item. In some implementations, an AGV may, during transit of the delivery vehicle along a route for delivering the set of deliveries, navigate to a point proximate to the storage location of the first item in the delivery vehicle, and retrieve the first item from the storage location in the delivery vehicle. The AGV may then deliver the first item to a delivery point.

25 Claims, 13 Drawing Sheets

(56) References Cited

U.S. PATENT DOCUMENTS

| | | |
|---|---|---|
| 4,010,409 A | 3/1977 | Waites |
| 4,215,759 A | 8/1980 | Diaz |
| 4,258,813 A | 3/1981 | Rubel |
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | MacKinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki et al. |
| 4,773,018 A | 9/1988 | Lundstrom |
| 4,777,601 A | 10/1988 | Boegli |
| 4,780,817 A | 10/1988 | Lofgren |
| 4,790,402 A | 12/1988 | Field et al. |
| 4,802,096 A | 1/1989 | Hainsworth et al. |
| 4,811,227 A | 3/1989 | Wikstrom |
| 4,811,229 A | 3/1989 | Wilson |
| 4,817,000 A | 3/1989 | Eberhardt |
| 4,846,297 A | 7/1989 | Field et al. |
| 4,847,769 A | 7/1989 | Reeve |
| 4,847,773 A | 7/1989 | van Helsdingen et al. |
| 4,847,774 A | 7/1989 | Tomikawa et al. |
| 4,852,677 A | 8/1989 | Okazaki |
| 4,857,912 A | 8/1989 | Everett, Jr. et al. |
| 4,858,132 A | 8/1989 | Holmquist |
| 4,862,047 A | 8/1989 | Suzuki et al. |
| 4,863,335 A | 9/1989 | Herigstad et al. |
| 4,875,172 A | 10/1989 | Kanayama |
| 4,890,233 A | 12/1989 | Ando et al. |
| 4,894,908 A | 1/1990 | Haba et al. |
| 4,918,607 A | 4/1990 | Wible |
| 4,924,153 A | 5/1990 | Toru et al. |
| 4,926,544 A | 5/1990 | Koyanagi et al. |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth et al. |
| 4,947,324 A | 8/1990 | Kamimura et al. |
| 4,950,118 A | 8/1990 | Mueller et al. |
| 4,954,962 A | 9/1990 | Evans, Jr. et al. |
| 4,982,329 A | 1/1991 | Tabata et al. |
| 4,990,841 A | 2/1991 | Elder |
| 4,993,507 A | 2/1991 | Ohkura |
| 4,994,970 A | 2/1991 | Noji et al. |
| 4,996,468 A | 2/1991 | Field et al. |
| 5,000,279 A | 3/1991 | Kondo et al. |
| 5,002,145 A | 3/1991 | Wakaumi et al. |
| 5,005,128 A | 4/1991 | Robins et al. |
| 5,006,988 A | 4/1991 | Borenstein et al. |
| 5,020,620 A | 6/1991 | Field |
| 5,023,790 A | 6/1991 | Luke, Jr. |
| 5,040,116 A | 8/1991 | Evans, Jr. et al. |
| 5,052,882 A | 10/1991 | Blau et al. |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett, Jr. et al. |
| 5,125,783 A | 6/1992 | Kawasoe et al. |
| 5,134,353 A | 7/1992 | Kita et al. |
| 5,138,560 A | 8/1992 | Lanfer et al. |
| 5,154,249 A | 10/1992 | Yardley |
| 5,164,648 A | 11/1992 | Kita et al. |
| 5,170,351 A | 12/1992 | Nemoto et al. |
| 5,170,352 A | 12/1992 | McTamaney et al. |
| 5,179,329 A | 1/1993 | Nishikawa et al. |
| 5,187,664 A | 2/1993 | Yardley et al. |
| 5,191,528 A | 3/1993 | Yardley et al. |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada Galan et al. |
| 5,216,605 A | 6/1993 | Yardley et al. |
| 5,239,249 A | 8/1993 | Ono |
| 5,249,157 A | 9/1993 | Taylor |
| 5,281,901 A | 1/1994 | Yardley et al. |
| 5,305,217 A | 4/1994 | Nakamura et al. |
| 5,341,130 A | 8/1994 | Yardley et al. |
| 5,387,853 A | 2/1995 | Ono |
| 5,488,277 A | 1/1996 | Nishikawa et al. |
| 5,510,984 A | 4/1996 | Markin et al. |
| 5,525,884 A | 6/1996 | Sugiura et al. |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Nishikawa et al. |
| 5,650,703 A | 7/1997 | Yardley et al. |
| 5,669,748 A | 9/1997 | Knudsen, Jr. |
| 5,875,408 A | 2/1999 | Bendett et al. |
| 5,911,767 A | 6/1999 | Garibotto et al. |
| 5,923,270 A | 7/1999 | Sampo et al. |
| 5,961,559 A | 10/1999 | Shimbara et al. |
| 6,049,745 A | 4/2000 | Douglas et al. |
| 6,058,339 A | 5/2000 | Takiguchi et al. |
| 6,092,010 A | 7/2000 | Alofs et al. |
| 6,246,930 B1 | 6/2001 | Hori |
| 6,256,560 B1 | 7/2001 | Kim et al. |
| 6,345,217 B1 | 2/2002 | Zeitler et al. |
| 6,370,452 B1 | 4/2002 | Pfister |
| 6,377,888 B1 | 4/2002 | Olch |
| 6,422,152 B1 * | 7/2002 | Rowe .................... B65G 9/002 104/121 |
| 6,459,966 B2 | 10/2002 | Nakano et al. |
| 6,477,463 B2 | 11/2002 | Hamilton |
| 6,493,614 B1 | 12/2002 | Jung |
| 6,602,037 B2 | 8/2003 | Winkler |
| 6,615,108 B1 | 9/2003 | Peless et al. |
| 6,629,028 B2 | 9/2003 | Paromtchik et al. |
| 6,654,647 B1 | 11/2003 | Kal |
| 6,721,638 B2 | 4/2004 | Zeitler |
| 6,748,292 B2 | 6/2004 | Mountz |
| 6,772,062 B2 | 8/2004 | Lasky et al. |
| 6,882,910 B2 | 4/2005 | Jeong |
| 6,885,912 B2 | 4/2005 | Peless et al. |
| 6,895,301 B2 | 5/2005 | Mountz |
| 6,904,343 B2 | 6/2005 | Kang |
| 6,950,722 B2 | 9/2005 | Mountz |
| 6,971,464 B2 | 12/2005 | Marino et al. |
| 7,050,891 B2 | 5/2006 | Chen |
| 7,110,855 B2 | 9/2006 | Leishman |
| 7,155,309 B2 | 12/2006 | Peless et al. |
| 7,305,287 B2 | 12/2007 | Park |
| 7,333,631 B2 | 2/2008 | Roh et al. |
| 7,349,759 B2 | 3/2008 | Peless et al. |
| 7,402,018 B2 | 7/2008 | Mountz et al. |
| 7,403,120 B2 | 7/2008 | Duron et al. |
| 7,437,226 B2 | 10/2008 | Roh et al. |
| 7,460,016 B2 | 12/2008 | Sorenson, Jr. et al. |
| 7,505,849 B2 | 3/2009 | Saarikivi |
| 7,548,166 B2 | 6/2009 | Roeder et al. |
| 7,557,714 B2 | 7/2009 | Roeder et al. |
| 7,609,175 B2 | 10/2009 | Porte et al. |
| 7,613,617 B2 | 11/2009 | Williams et al. |
| 7,616,127 B2 | 11/2009 | Sorenson, Jr. et al. |
| 7,634,332 B2 | 12/2009 | Williams et al. |
| 7,639,142 B2 | 12/2009 | Roeder et al. |
| 7,648,329 B2 | 1/2010 | Chilson et al. |
| 7,656,296 B2 | 2/2010 | Runyon et al. |
| 7,681,796 B2 | 3/2010 | Cato et al. |

(56) References Cited

U.S. PATENT DOCUMENTS

| | | |
|---|---|---|
| 7,689,001 B2 | 3/2010 | Kim et al. |
| 7,693,757 B2 | 4/2010 | Zimmerman |
| 7,765,027 B2 | 7/2010 | Hong et al. |
| 7,826,919 B2 | 11/2010 | DAndrea et al. |
| 7,835,821 B2 | 11/2010 | Roh et al. |
| 7,840,328 B2 | 11/2010 | Baginski et al. |
| 7,845,560 B2 | 12/2010 | Emanuel et al. |
| 7,850,413 B2 | 12/2010 | Fontana |
| 7,873,469 B2 | 1/2011 | DAndrea et al. |
| 7,890,228 B2 | 2/2011 | Redmann, Jr. et al. |
| 7,894,932 B2 | 2/2011 | Mountz et al. |
| 7,894,933 B2 | 2/2011 | Mountz et al. |
| 7,894,939 B2 | 2/2011 | Zini et al. |
| 7,894,951 B2 | 2/2011 | Norris et al. |
| 7,912,574 B2 | 3/2011 | Wurman et al. |
| 7,912,633 B1 | 3/2011 | Dietsch et al. |
| 7,920,962 B2 | 4/2011 | DAndrea et al. |
| 7,925,514 B2 | 4/2011 | Williams et al. |
| 7,953,551 B2 | 5/2011 | Park et al. |
| 7,980,808 B2 | 7/2011 | Chilson et al. |
| 7,991,521 B2 | 8/2011 | Stewart |
| 7,996,109 B2 | 8/2011 | Zini et al. |
| 8,010,230 B2 | 8/2011 | Zini et al. |
| 8,020,657 B2 | 9/2011 | Allard et al. |
| 8,031,086 B2 | 10/2011 | Thacher et al. |
| 8,068,978 B2 | 11/2011 | DAndrea et al. |
| 8,072,309 B2 | 12/2011 | Kraimer et al. |
| 8,075,243 B2 | 12/2011 | Chilson et al. |
| 8,146,702 B2 | 4/2012 | Schendel et al. |
| 8,160,728 B2 | 4/2012 | Curtis |
| 8,170,711 B2 | 5/2012 | DAndrea et al. |
| 8,192,137 B2 | 6/2012 | Ross et al. |
| 8,193,903 B2 | 6/2012 | Kraimer et al. |
| 8,196,835 B2 | 6/2012 | Emanuel et al. |
| 8,200,423 B2 | 6/2012 | Dietsch et al. |
| 8,204,624 B2 | 6/2012 | Zini et al. |
| 8,210,791 B2 | 7/2012 | Chilson et al. |
| 8,220,710 B2 | 7/2012 | Hoffman et al. |
| 8,229,619 B2 | 7/2012 | Roh et al. |
| 8,239,291 B2 | 8/2012 | Hoffman et al. |
| 8,265,873 B2 | 9/2012 | DAndrea et al. |
| 8,269,643 B2 | 9/2012 | Chou |
| 8,271,132 B2 | 9/2012 | Nielsen et al. |
| 8,280,546 B2 | 10/2012 | DAndrea et al. |
| 8,280,547 B2 | 10/2012 | DAndrea et al. |
| 8,311,902 B2 | 11/2012 | Mountz et al. |
| 8,369,981 B2 | 2/2013 | Dunsker et al. |
| 8,381,982 B2 | 2/2013 | Kunzig et al. |
| 8,406,949 B2 | 3/2013 | Kondo |
| 8,412,400 B2 | 4/2013 | DAndrea et al. |
| 8,417,444 B2 | 4/2013 | Smid |
| 8,418,919 B1 | 4/2013 | Beyda |
| 8,433,442 B2 | 4/2013 | Friedman et al. |
| 8,433,469 B2 | 4/2013 | Harvey et al. |
| 8,444,369 B2 | 5/2013 | Watt et al. |
| 8,452,464 B2 | 5/2013 | Castaneda et al. |
| 8,457,978 B2 | 6/2013 | Williams et al. |
| 8,473,140 B2 | 6/2013 | Norris et al. |
| 8,483,869 B2 | 7/2013 | Wurman et al. |
| 8,498,734 B2 | 7/2013 | Dunsker et al. |
| 8,515,612 B2 | 8/2013 | Tanaka et al. |
| 8,538,692 B2 | 9/2013 | Wurman et al. |
| 8,571,781 B2 | 10/2013 | Bernstein et al. |
| 8,577,551 B2 | 11/2013 | Siefring et al. |
| 8,587,455 B2 | 11/2013 | Porte et al. |
| 8,594,834 B1 | 11/2013 | Clark et al. |
| 8,606,392 B2 | 12/2013 | Wurman et al. |
| 8,626,332 B2 | 1/2014 | Dunsker et al. |
| 8,626,335 B2 | 1/2014 | Wurman et al. |
| 8,639,382 B1 | 1/2014 | Clark et al. |
| 8,649,899 B2 | 2/2014 | Wurman et al. |
| 8,653,945 B2 | 2/2014 | Baek et al. |
| 8,670,892 B2 | 3/2014 | Yang |
| 8,676,426 B1 | 3/2014 | Murphy |
| 8,700,502 B2 | 4/2014 | Mountz et al. |
| 8,718,814 B1 | 5/2014 | Clark et al. |
| 8,725,286 B2 | 5/2014 | DAndrea et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,751,063 B2 | 6/2014 | Bernstein et al. |
| 8,751,147 B2 | 6/2014 | Colwell |
| 8,755,936 B2 | 6/2014 | Friedman et al. |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark et al. |
| 8,798,786 B2 | 8/2014 | Wurman et al. |
| 8,798,840 B2 | 8/2014 | Fong et al. |
| 8,805,573 B2 | 8/2014 | Brunner et al. |
| 8,805,574 B2 | 8/2014 | Stevens et al. |
| 8,825,257 B2 | 9/2014 | Ozaki et al. |
| 8,831,984 B2 | 9/2014 | Hoffman et al. |
| 8,862,397 B2 | 10/2014 | Tsujimoto et al. |
| 8,874,300 B2 | 10/2014 | Allard et al. |
| 8,874,360 B2 | 10/2014 | Klinger et al. |
| 8,880,416 B2 | 11/2014 | Williams et al. |
| 8,886,385 B2 | 11/2014 | Takahashi et al. |
| 8,892,240 B1 | 11/2014 | Vliet et al. |
| 8,892,241 B2 | 11/2014 | Weiss |
| 8,909,368 B2 | 12/2014 | DAndrea et al. |
| 8,930,133 B2 | 1/2015 | Wurman et al. |
| 8,948,956 B2 | 2/2015 | Takahashi et al. |
| 8,954,188 B2 | 2/2015 | Sullivan et al. |
| 8,965,561 B2 | 2/2015 | Jacobus et al. |
| 8,965,562 B1 | 2/2015 | Wurman et al. |
| 8,965,578 B2 | 2/2015 | Versteeg et al. |
| 8,970,363 B2 | 3/2015 | Kraimer et al. |
| 8,972,045 B1 | 3/2015 | Mountz et al. |
| 8,983,647 B1 | 3/2015 | Dwarakanath et al. |
| 8,988,285 B2 | 3/2015 | Smid et al. |
| 8,989,918 B2 | 3/2015 | Sturm |
| 9,002,506 B1 | 4/2015 | Agarwal et al. |
| 9,002,581 B2 | 4/2015 | Castaneda et al. |
| 9,008,827 B1 | 4/2015 | Dwarakanath et al. |
| 9,008,828 B2 | 4/2015 | Worsley |
| 9,008,829 B2 | 4/2015 | Worsley |
| 9,008,830 B2 | 4/2015 | Worsley |
| 9,009,072 B2 | 4/2015 | Mountz et al. |
| 9,014,902 B1 | 4/2015 | Murphy |
| 9,020,679 B2 | 4/2015 | Zini et al. |
| 9,026,301 B2 | 5/2015 | Zini et al. |
| 9,043,016 B2 | 5/2015 | Filippov et al. |
| 9,046,893 B2 | 6/2015 | Douglas et al. |
| 9,052,714 B2 | 6/2015 | Creasey et al. |
| 9,056,719 B2 | 6/2015 | Tanahashi |
| 9,067,317 B1 | 6/2015 | Wurman et al. |
| 9,073,736 B1 | 7/2015 | Hussain et al. |
| 9,082,293 B2 | 7/2015 | Wellman et al. |
| 9,087,314 B2 | 7/2015 | Hoffman et al. |
| 9,090,214 B2 | 7/2015 | Bernstein et al. |
| 9,090,400 B2 | 7/2015 | Wurman et al. |
| 9,098,080 B2 | 8/2015 | Norris et al. |
| 9,110,464 B2 | 8/2015 | Holland et al. |
| 9,111,251 B1 | 8/2015 | Brazeau |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B2 | 11/2015 | Dwarakanath et al. |
| 9,188,982 B2 | 11/2015 | Thomson |
| 9,193,404 B2 | 11/2015 | Bernstein et al. |
| 9,202,382 B2 | 12/2015 | Klinger et al. |
| 9,206,023 B2 | 12/2015 | Wong et al. |
| 9,207,673 B2 | 12/2015 | Pulskamp et al. |
| 9,207,676 B2 | 12/2015 | Wu et al. |
| 9,211,920 B1 | 12/2015 | Bernstein et al. |

(56) References Cited

U.S. PATENT DOCUMENTS

| | | | |
|---|---|---|---|
| 9,213,934 B1 | 12/2015 | Versteeg et al. | |
| 9,216,745 B2 | 12/2015 | Beardsley et al. | |
| 9,218,003 B2 | 12/2015 | Fong et al. | |
| 9,218,316 B2 | 12/2015 | Bernstein et al. | |
| 9,242,799 B1 | 1/2016 | OBrien et al. | |
| 9,244,463 B2 | 1/2016 | Pfaff et al. | |
| 9,248,973 B1 | 2/2016 | Brazeau | |
| 9,260,244 B1 | 2/2016 | Cohn | |
| 9,266,236 B2 | 2/2016 | Clark et al. | |
| 9,268,334 B1 | 2/2016 | Vavrick | |
| 9,274,526 B2 | 3/2016 | Murai et al. | |
| 9,280,153 B1 | 3/2016 | Palamarchuk et al. | |
| 9,280,157 B2 | 3/2016 | Wurman et al. | |
| 9,290,220 B2 | 3/2016 | Bernstein et al. | |
| 9,304,001 B2 | 4/2016 | Park et al. | |
| 9,310,802 B1 | 4/2016 | Elkins et al. | |
| 9,317,034 B2 | 4/2016 | Hoffman et al. | |
| 9,329,078 B1 | 5/2016 | Mundhenke et al. | |
| 9,329,599 B1 | 5/2016 | Sun et al. | |
| 9,330,373 B2 | 5/2016 | Mountz et al. | |
| 9,341,720 B2 | 5/2016 | Garin et al. | |
| 9,342,811 B2 | 5/2016 | Mountz et al. | |
| 9,346,619 B1 | 5/2016 | OBrien et al. | |
| 9,346,620 B2 | 5/2016 | Brunner et al. | |
| 9,352,745 B1 | 5/2016 | Theobald | |
| 9,355,065 B2 | 5/2016 | Donahue | |
| 9,365,348 B1 | 6/2016 | Agarwal et al. | |
| 9,367,827 B1 | 6/2016 | Lively et al. | |
| 9,367,831 B1 | 6/2016 | Besehanic | |
| 9,371,184 B1 | 6/2016 | Dingle et al. | |
| 9,378,482 B1 | 6/2016 | Pikler et al. | |
| 9,389,609 B1 | 7/2016 | Mountz et al. | |
| 9,389,612 B2 | 7/2016 | Bernstein et al. | |
| 9,389,614 B2 | 7/2016 | Shani | |
| 9,394,016 B2 | 7/2016 | Bernstein et al. | |
| 9,395,725 B2 | 7/2016 | Bernstein et al. | |
| 9,404,756 B2 | 8/2016 | Fong et al. | |
| 9,405,016 B2 | 8/2016 | Yim | |
| 9,427,874 B1 | 8/2016 | Rublee | |
| 9,429,940 B2 | 8/2016 | Bernstein et al. | |
| 9,429,944 B2 | 8/2016 | Filippov et al. | |
| 9,436,184 B2 | 9/2016 | DAndrea et al. | |
| 9,440,790 B2 | 9/2016 | Mountz et al. | |
| 9,448,560 B2 | 9/2016 | DAndrea et al. | |
| 9,451,020 B2 | 9/2016 | Liu et al. | |
| 9,452,883 B1 | 9/2016 | Wurman et al. | |
| 9,457,730 B2 | 10/2016 | Bernstein et al. | |
| 2006/0245893 A1 | 11/2006 | Schottke | |
| 2010/0234990 A1* | 9/2010 | Zini | G05D 1/0274 |
| | | | 700/245 |
| 2010/0300841 A1 | 12/2010 | OBrien | |
| 2012/0321423 A1 | 12/2012 | MacKnight et al. | |
| 2013/0058743 A1 | 3/2013 | Rebstock | |
| 2013/0096735 A1 | 4/2013 | Byford et al. | |
| 2013/0302132 A1 | 11/2013 | DAndrea | |
| 2014/0124462 A1 | 5/2014 | Yamashita | |
| 2014/0143061 A1* | 5/2014 | Abhyanker | G06Q 30/0261 |
| | | | 705/14.58 |
| 2014/0370167 A1* | 12/2014 | Garden | B60P 3/007 |
| | | | 426/233 |
| 2015/0073589 A1 | 3/2015 | Khodl et al. | |
| 2015/0117995 A1 | 4/2015 | DAndrea | |
| 2015/0307278 A1 | 10/2015 | Wickham et al. | |
| 2016/0090248 A1 | 3/2016 | Worsley et al. | |
| 2016/0176637 A1 | 6/2016 | Ackerman et al. | |
| 2016/0203543 A1 | 7/2016 | Snow | |
| 2016/0232477 A1 | 8/2016 | Cortes et al. | |
| 2016/0347545 A1 | 12/2016 | Lindbo et al. | |
| 2017/0043953 A1 | 2/2017 | Battles et al. | |
| 2017/0174431 A1* | 6/2017 | Borders | B65G 67/02 |
| 2018/0072404 A1* | 3/2018 | Prager | B66D 1/485 |
| 2018/0088586 A1 | 3/2018 | Hance et al. | |
| 2018/0089616 A1 | 3/2018 | Jacobus et al. | |
| 2018/0155029 A1* | 6/2018 | Gil | B65G 1/06 |
| 2018/0341904 A1 | 11/2018 | Aleman et al. | |
| 2019/0143872 A1* | 5/2019 | Gil | A47F 5/08 |
| | | | 211/86.01 |
| 2019/0315236 A1* | 10/2019 | Mere | H02J 7/00034 |
| 2020/0070717 A1* | 3/2020 | Garden | B60Q 1/2696 |
| 2020/0103882 A1 | 4/2020 | Sullivan et al. | |

FOREIGN PATENT DOCUMENTS

| | | |
|---|---|---|
| CA | 1228142 A | 10/1987 |
| CA | 1238103 A | 6/1988 |
| CA | 1264490 A | 1/1990 |
| CA | 1267866 A | 4/1990 |
| CA | 1269740 A | 5/1990 |
| CA | 1271544 A | 7/1990 |
| CA | 1275721 C | 10/1990 |
| CA | 1276264 C | 11/1990 |
| CA | 2029773 A1 | 5/1991 |
| CA | 1291725 C | 11/1991 |
| CA | 2036104 A1 | 11/1991 |
| CA | 2042133 A1 | 1/1992 |
| CA | 2049578 A1 | 2/1992 |
| CA | 2296837 A1 | 2/1992 |
| CA | 2094833 A1 | 4/1992 |
| CA | 1304043 C | 6/1992 |
| CA | 2095442 A1 | 6/1992 |
| CA | 1304820 C | 7/1992 |
| CA | 1323084 C | 10/1993 |
| CA | 2189853 A1 | 11/1995 |
| CA | 2244668 A1 | 3/1999 |
| CA | 2469652 A1 | 6/2003 |
| CA | 2514523 A1 | 8/2004 |
| CA | 2565553 A1 | 11/2005 |
| CA | 2577346 A1 | 4/2006 |
| CA | 2613180 A1 | 1/2007 |
| CA | 2921584 A1 | 1/2007 |
| CA | 2625885 A1 | 4/2007 |
| CA | 2625895 A1 | 4/2007 |
| CA | 2837477 A1 | 4/2007 |
| CA | 2864027 A1 | 4/2007 |
| CA | 2636233 A1 | 7/2007 |
| CA | 2640769 A1 | 8/2007 |
| CA | 2652114 A1 | 12/2007 |
| CA | 2654258 A1 | 12/2007 |
| CA | 2654260 A1 | 12/2007 |
| CA | 2654263 A1 | 12/2007 |
| CA | 2654295 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781624 A1 | 12/2007 |
| CA | 2781857 A1 | 12/2007 |
| CA | 2838044 A1 | 12/2007 |
| CA | 2866664 A1 | 12/2007 |
| CA | 2921134 A1 | 12/2007 |
| CA | 2663578 A1 | 4/2008 |
| CA | 2860745 A1 | 4/2008 |
| CA | 2671955 A1 | 7/2008 |
| CA | 2673025 A1 | 7/2008 |
| CA | 2674241 A1 | 7/2008 |
| CA | 2691710 A1 | 12/2008 |
| CA | 2721345 A1 | 10/2009 |
| CA | 2760127 A1 | 11/2009 |
| CA | 2760225 A1 | 11/2009 |
| CA | 2743706 A1 | 6/2010 |
| CA | 2754626 A1 | 9/2010 |
| CA | 2765565 A1 | 1/2011 |
| CA | 2932535 A1 | 1/2011 |
| CA | 2932537 A1 | 1/2011 |
| CA | 2770139 A1 | 2/2011 |
| CA | 2773963 A1 | 3/2011 |
| CA | 2778111 A1 | 5/2011 |
| CA | 2784874 A1 | 7/2011 |
| CA | 2868578 A1 | 7/2011 |
| CA | 2806852 A1 | 2/2012 |
| CA | 2823715 A1 | 7/2012 |
| CA | 2827281 A1 | 8/2012 |
| CA | 2827735 A1 | 8/2012 |

(56) References Cited

FOREIGN PATENT DOCUMENTS

| | | |
|---|---|---|
| CA | 2770715 A1 | 9/2012 |
| CA | 2770918 A1 | 9/2012 |
| CA | 2831832 A1 | 10/2012 |
| CA | 2836933 A1 | 12/2012 |
| CA | 2851774 A1 | 4/2013 |
| CA | 2799871 A1 | 6/2013 |
| CA | 2866708 A1 | 9/2013 |
| CA | 2938894 A1 | 9/2013 |
| CA | 2813874 A1 | 12/2013 |
| CA | 2824189 A1 | 2/2014 |
| CA | 2870381 A1 | 4/2014 |
| CA | 2935223 A1 | 4/2014 |
| CA | 2894546 A1 | 6/2014 |
| CA | 2845229 A1 | 9/2014 |
| CA | 2899553 A1 | 10/2014 |
| CA | 2882452 A1 | 8/2015 |
| CA | 2886121 A1 | 10/2015 |
| WO | 2012154872 A2 | 11/2012 |
| WO | 2016015000 A2 | 1/2016 |

OTHER PUBLICATIONS

US 9,050,932 B2, 06/2015, Bernstein et al. (withdrawn)
US 9,342,073 B2, 05/2016, Bernstein et al. (withdrawn)
Warehouse Robots at Work, IEEE Spectrum,. Jul. 21, 2008, YouTube https://www.youtube.com/watch?v=IWsMdN7HMuA.
International Search Report and Written Opinion, PCT/US2017/054627, dated Jan. 5, 2018 (15 pages).
International Search Report and Written Opinion, PCT/US2018/012645, dated Mar. 7, 2018 (13 pages).
International Search Report and Written Opinion, PCT/US2018/012641, dated Mar. 7, 2018 (17 pages).

\* cited by examiner

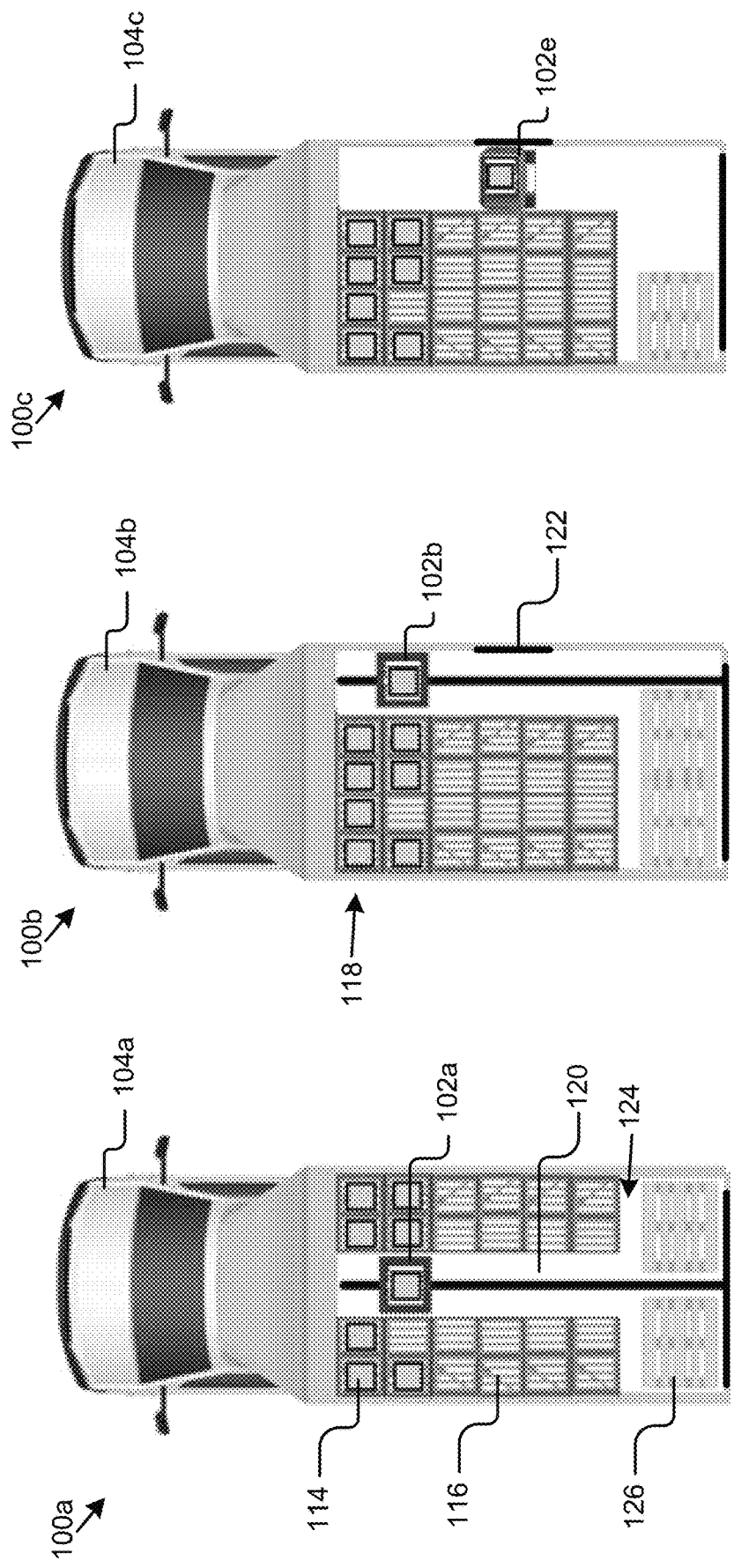

AUTOMATED PREPARATION OF DELIVERIES IN DELIVERY VEHICLES USING AUTOMATED GUIDED VEHICLES

BACKGROUND

This application relates to automated preparation of deliveries, for example, by an automated guided vehicle operating in a delivery vehicle.

A delivery vehicle may receive, transport, and deliver tens or even hundreds of orders containing numerous individual items; however, during delivery, a human worker typically enters a storage compartment of a delivery vehicle, searches for an item, physically picks up the item, and carries it to a delivery location. However, when performing such tasks, humans quickly become physically and mentally tired leading them to work inefficiently, commit errors, and require breaks or work at a slower pace. These solutions require sufficient space within the delivery vehicle for a human to move around, carry items, and, potentially, drag a hand truck, which wastes space in the delivery vehicle. Further, because a delivery must be stopped before it is safe for a human worker to move within the storage area of the delivery vehicle, additional time is required to retrieve items once the delivery vehicle arrives at a delivery destination.

Accordingly, improved delivery vehicle preparation solutions are desirable.

SUMMARY

The technology may include a delivery coordination system including: an automated guided vehicle (AGV); a delivery vehicle; and a computing system including one or more processors and a memory storing instructions that, when executed by the one or more processors, cause the system to: determine a future delivery in a set of deliveries assigned to the delivery vehicle, the future delivery including a first item; determine a storage location of the first item in the delivery vehicle; during transit of the delivery vehicle along a route for delivering the set of deliveries, navigate the AGV to a point proximate to the storage location of the first item in the delivery vehicle, and retrieve, by the AGV, the first item from the storage location in the delivery vehicle; and deliver, by the AGV, the first item to a delivery point.

Implementations may include a method including: determining, by a delivery coordination engine, a delivery entry representing a future delivery in a set of delivery entries representing a set of deliveries assigned to a delivery vehicle, the future delivery entry including a first item; determining, by the delivery coordination engine, a storage location of the first item in the delivery vehicle; during transit of the delivery vehicle along a route for delivering the set of deliveries, navigating an automated guided vehicle (AGV) to a point proximate to the storage location of the first item in the delivery vehicle, and retrieving, by the AGV, the first item from the storage location in the delivery vehicle; and delivering, by the AGV, the first item to a delivery point.

Implementations may include one or more of the following features. The method including securing the AGV using a stability mechanism of the delivery vehicle, the stabilizing mechanism being adapted to impede movement of the AGV within the delivery vehicle. The method where securing the AGV includes using a stabilizing mechanism interface of the AGV to interact with the stabilizing mechanism of the delivery vehicle to stabilize the AGV during acceleration of the delivery vehicle. The method where securing the AGV is performed in response to a defined trigger, the defined trigger including one or more of a threshold acceleration of the delivery vehicle, a threshold velocity of the delivery vehicle, and entrance of the delivery vehicle into a geographic area. The method including determining, based on attributes of a calculated route between a previous delivery in the set of deliveries and the future delivery, an area of the calculated route in which the AGV may perform one or more of navigating to the point proximate to the storage location, retrieving the first item from the storage location, and securing to the delivery vehicle. The method where retrieving the first item from the storage location in the delivery vehicle includes actuating a mechanism coupled with a shelf in the delivery vehicle to transport the first item toward an item handling mechanism of the AGV. The method including: determining that a second storage location of a second item is in front of the storage location of the first item on a shelf of the delivery vehicle; and in response to determining that the second storage location is in front of the storage location of the first item, transporting, by the AGV, the second item to a third storage location. The method including: determining a sequence of the set of entries representing the set of deliveries assigned to the delivery vehicle; and determining the third storage location based on the sequence of the set of entries, the third storage location satisfying a constraint that the third storage location is not in front of a prior-delivery storage location in the delivery vehicle, the prior-delivery storage location including a location of a prior-delivery item in the sequence of the set of entries, the prior-delivery item being delivered earlier in the sequence of the set of entries than the second item. The method where delivering the first item to the delivery point includes determining a delivery door from a plurality of doors of the delivery vehicle based on the delivery door being associated with the delivery entry representing the future delivery, the delivery door being determined based on attributes of the future delivery stored in a database accessible to the delivery coordination engine, and navigating the AGV to the delivery point using the delivery door. The method where delivering the first item to the delivery point includes navigating the AGV from the inside of the delivery vehicle to the delivery point, the delivery point being located outside of the delivery vehicle, the AGV being configured to travel into and out of the delivery vehicle. The method where determining the delivery entry representing the future delivery in the set of delivery entries assigned to the delivery vehicle includes receiving location data from a computing system of the delivery vehicle, and determining, based on the location data, the delivery entry representing the future delivery from the set of delivery entries based on the delivery vehicle being within a defined threshold distance from a location of the future delivery.

Another aspect includes AGV including: a body; a drive unit coupled with the body and providing motive force to the body; a guidance system locating the AGV in a delivery vehicle, the guidance system providing location data to a controller of the AGV; an item handling mechanism (IHM) coupled with the body, the IHM adapted to move one or more items; and the controller coupled with the drive unit, the guidance system, and the item handling mechanism, the controller causing the AGV to perform operations including: determining a storage location in the delivery vehicle of a first item; and during transit of the delivery vehicle along a route for delivering a set of deliveries, navigating to a point proximate to the storage location of the first item in the delivery vehicle using the drive unit and the guidance system, and retrieving, by the AGV, the first item from the storage location in the delivery vehicle using the IHM; and delivering, by the AGV, the first item to a delivery point.

Implementations may include one or more of the following features. The AGV where the AGV includes a stabilizing mechanism interface configured to interact with a stabilizing mechanism of the delivery vehicle to stabilize the AGV during acceleration of the delivery vehicle. The AGV where the AGV includes an output device, the output device causing an item moving mechanism of a shelf to transport items between the storage location of the first item toward the IHM of the AGV. The AGV where the IHM includes a carrying device that receives the first item from the storage location on a shelf in the delivery vehicle. The AGV where the controller causes the AGV to stabilize itself using a stabilizing mechanism of the delivery vehicle in response to the controller detecting a threshold velocity of the delivery vehicle.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 1A-1C are illustrations of example delivery vehicles with example automated guided vehicles operating in the delivery vehicles.

DESCRIPTION

Figure 2A:
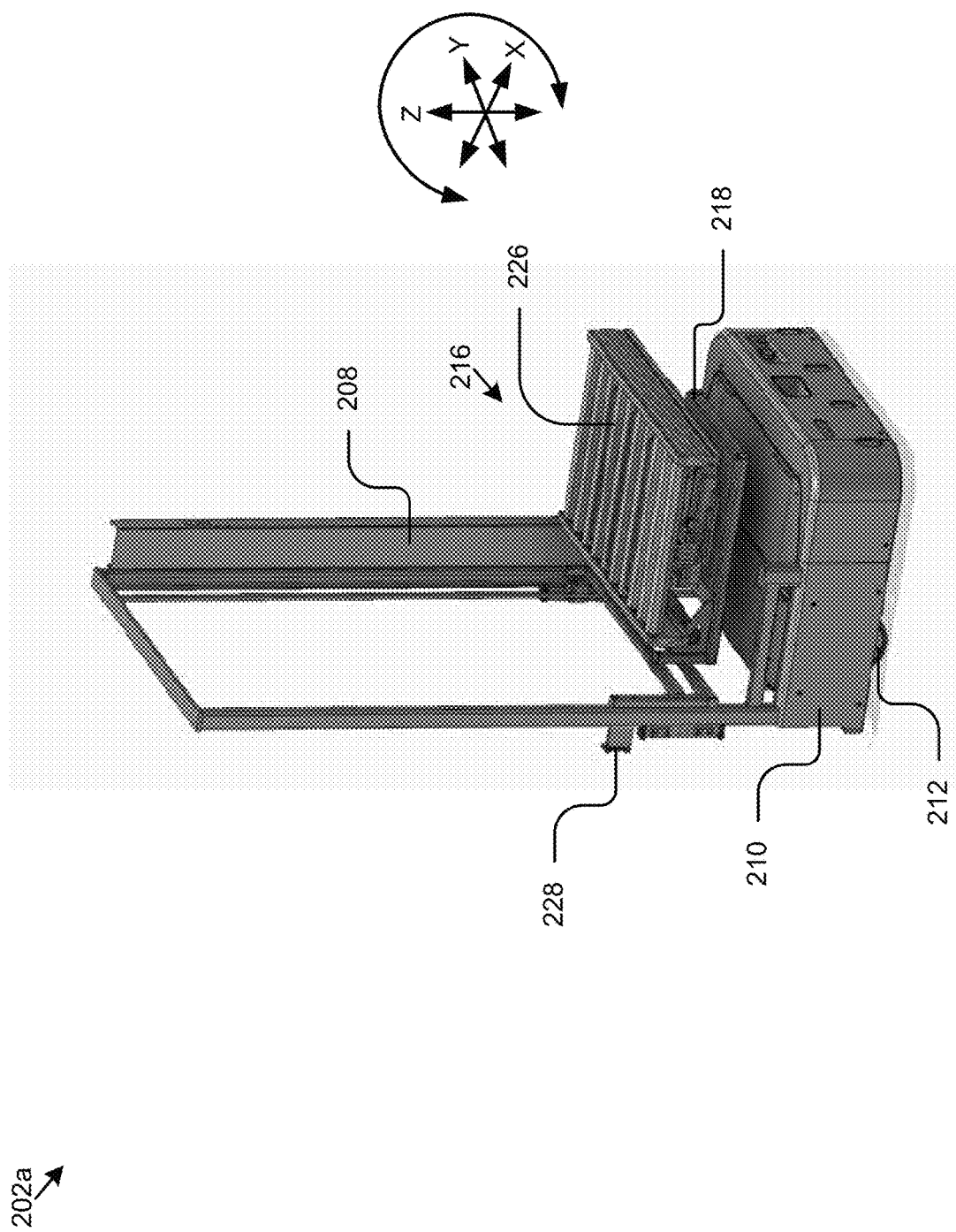
FIGS. 2A-2E are illustrations of example automated guided vehicles.

Among other benefits, the technology described herein improves upon the technology described in the Background Section. For instance, the technology provides robotic devices, systems, methods, and other aspects that can efficiently prepare or otherwise stage deliveries for delivery. The technology may automate storage and/or retrieval of items in a delivery vehicle 104 using robotic technology that, in some implementations, may travel with the delivery vehicle 104 to support delivery operations. For instance, the technology described herein describes example automated guided vehicles ("AGVs") 102 that transport items. An item may be a physical object, such as a product, box or container of products, etc. Some implementations of the technology described herein may include a system and method that includes determining locations of items in a particular delivery vehicle 104 and autonomously manipulating the items to place them in the determined locations by an AGV 102.

Some implementations of the AGV 102 may load items in the delivery vehicle 104 and, in some instances, may be installed, loaded, or embedded into the delivery vehicle 104 to support shipping and delivery operations. Further, some implementations may include advancements to computing systems, computer logic, guidance systems, and shelving systems for supporting the preparation of items in delivery vehicles 104 for delivery using the AGVs 102, as described in further detail elsewhere herein. Further, according to some implementations, hardware and computer logic aspects of the technology work together to execute tasks described herein and solve the problems discussed in the Background, for example.

The technologies described herein are beneficial over the previous solutions described in the Background at least because the algorithms and devices may automatically determine storage locations within a delivery vehicle 104 such that items may be automatically retrieved from the delivery vehicle. For instance, the operations and devices described herein may reduce the shuffling of items, distance moved by an AGV 102, time expended for retrieving the items during delivery, probability that a robot will fall over or drop an item during movement of a delivery vehicle, and/or space used by the items. For example, the systems and logic described herein may automatically retrieve and stage items during operation of a delivery vehicle, so that time that a delivery vehicle spends stopped is reduced and delivery vehicle and human worker productivity is improved.

Further, the technology described herein may allow an AGV 102 to autonomously prepare a delivery vehicle 104 by autonomously retrieving items from designated locations in the delivery vehicle 104, thereby reducing physical fatigue of human workers. The technologies beneficially improve productivity, increase asset utilization, and lower cycle time and labor costs. These benefits, in turn, lead to shorter delivery times and result in significant savings and business value.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIGS. 1A-1C are illustrations 100a, 100b, and 100c of example delivery vehicles and automated guided vehicles. FIGS. 1A-1C illustrate delivery vehicles 104a . . . 104c, AGVs 102a . . . 102c operating in the delivery vehicles 104 with items to be delivered. As discussed in further detail elsewhere herein, some or all of the components of the environment may include communication devices and computer logic allowing coordination of the components in order to more effectively autonomously load the delivery vehicles 104. It should be noted that the example delivery vehicles 104 illustrated in FIGS. 1A-1C may be modified with additional or fewer components or a different layout without departing from the scope of this disclosure.

A delivery vehicle 104 may include a truck (e.g., a box truck), trailer (e.g., connected with a truck), van, autonomous vehicle, etc. The delivery vehicle 104 includes a storage area 124 in which items may be placed (e.g., using an AGV 102, as discussed herein) for transportation to delivery destinations. As illustrated in FIGS. 1A-1C, an item may include a carton 114, although it should be understood that an item may be any physical object.

Figure 8:
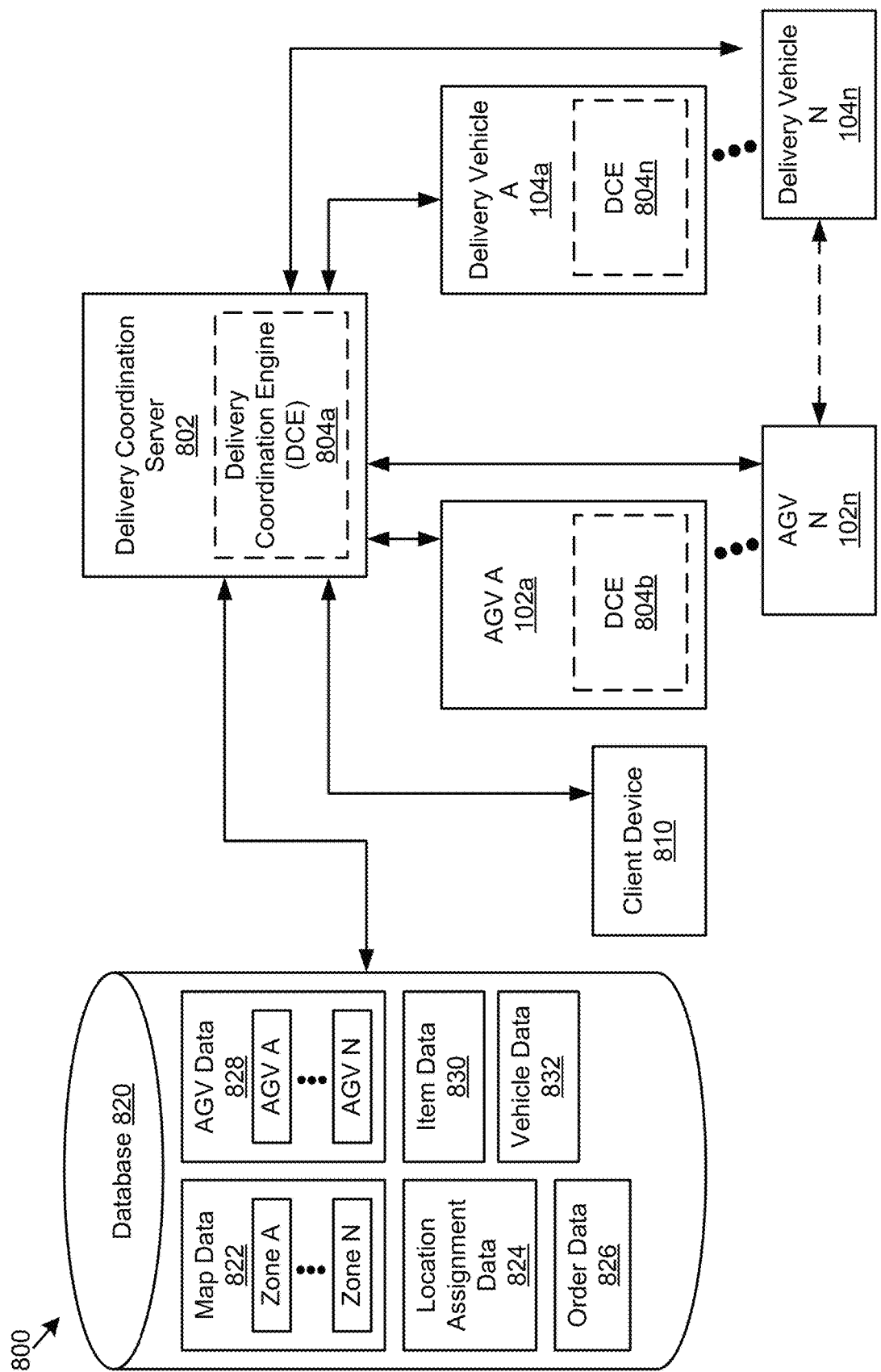
FIG. 8 is a block diagram of an example delivery coordination system and data communication flow for automated preparation of deliveries in delivery vehicles using automated guided vehicles.

In some implementations, the delivery vehicle 104 may include a computing system that may communicate with other components of the delivery coordination system and may, in some instances, perform some operations described in reference to the delivery coordination engine 804 (e.g., as described in reference to FIG. 8). For example, the computing system of the delivery vehicle 104 may transmit information to an AGV 102 associated with the delivery vehicle 104, as described below.

The storage area 124 may include one or more doors, such as a side door, back door, front door (e.g., in or to a cab of the delivery vehicle 104) or even a top door, which, in some instances, may be tied to defined operations. For example, a side door may be used for loading or deliveries at locations without loading/unloading docks (e.g., at a curbside), a back door may be used for loading or deliveries at locations with loading/unloading docks, a front door may load items directly into or adjacent to a cab of the delivery vehicle 104, and a top door may be used with an aerial drone to deliver items from the delivery vehicle 104. The delivery doors may be associated with delivery destinations and used by the delivery coordination engine 804 to define to which door an AGV 102 may bring items during delivery or, in some implementations, to determine placement locations of the items inside of the storage area of the delivery vehicle 104. For instance, the AGV 102 may automatically transport an item to a specific door in the delivery vehicle 104 during delivery, as described in further detail in reference to FIG. 5.

In some implementations, the storage area 124 of the delivery vehicle 104 may include a designated compartment or station (e.g., associated with a top door) into which an AGV 102 may place items during delivery to feed a drone (not shown), which may then transport the item to a delivery location from the delivery vehicle 104. For example, a delivery drone may be permitted to leave the delivery vehicle 104 when the speed of the delivery vehicle 104 is below a defined threshold, when the delivery vehicle 104 is within a threshold distance from the delivery destination, based on the charge state of the drone, and/or using other criteria.

Figure 3:
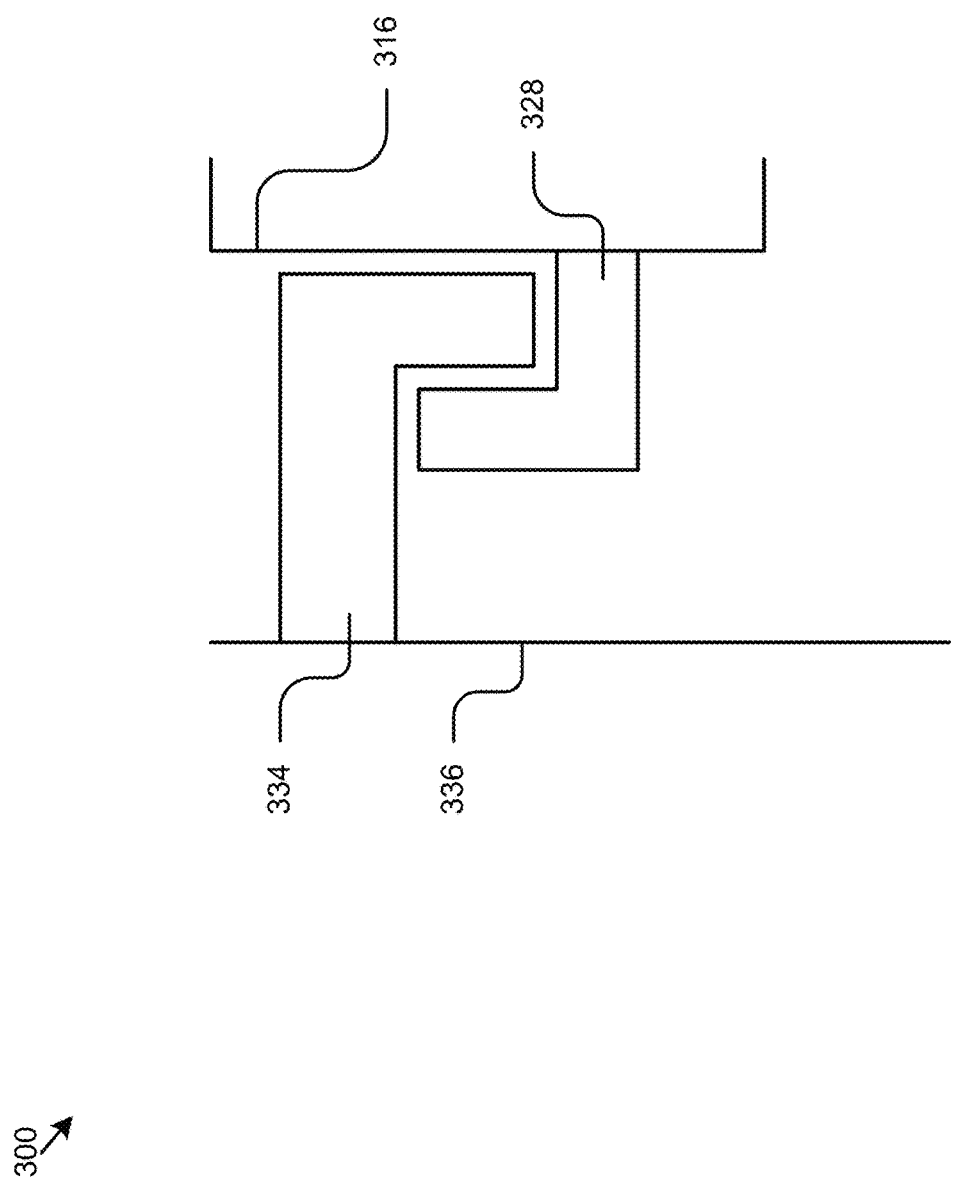
FIG. 3 is an illustration of an example stability mechanism for use with some implementations of automated guided vehicles and delivery vehicles.

The storage area 124 of the delivery vehicle 104 may include a stability mechanism adapted to impede certain movement of the AGV 102 within the delivery vehicle 104, for example, the stability mechanism may include rails, hooks, magnets, etc., for example, as described in reference to FIG. 3.

The storage area 124 of the delivery vehicle 104 may include one or more shelves 116, which may be adapted to hold multiple items deep (e.g., between an aisle 120 of the storage area 124 and a wall of the storage area 124), for example, as shown at 118 in the delivery vehicle 104b in FIG. 1B. In some implementations, the storage shelves 116 may be arranged along one side of the storage area 124, for example the shelves 116 may be on the left side of the storage area 124 to enable movement of the AGV 102 along the right side and access of the AGV 102 to place items next to a right hand delivery door 122 (e.g., as illustrated in example delivery vehicles 104b and 104c in FIGS. 1B and 1C, respectively). In some implementations, the shelves 116 may be arranged along both the left and right side of the storage area 124 (e.g., as illustrated in example delivery vehicle 104a in FIG. 1A), so that the AGV 102 may travel down the center of the storage area 124 thereby reducing the distance between the items placed in the back (e.g., distal from the AGV 102 and proximate to wall of the storage area 124) of a shelf 116 and the front of a shelf 116. In some implementations, a shelf 116 may include a mechanism adapted to transport items between a first side of the shelf 116 proximate to the AGV 102 and a second side of the shelf 116 distal from the AGV 102 so that items can be stored multiple items deep, for example, as illustrated at 118. An example implementation of the shelves 116 is described in reference to the shelves 406 and shelving unit 402 illustrated in FIG. 4.

In some implementations, the storage area 124 of a delivery vehicle 104 may also include designated storage places for one or more pallets 126, for example, for larger orders.

In some implementations, the storage area 124 of a delivery vehicle 104 may include components used in an AGV 102 guidance system of an AGV 102 to locate itself, its item handling mechanism (IHM) 216, and/or items in the delivery vehicle 104. For example, the AGV 102 guidance system may include beacons, QR codes or other symbols, etc., for providing location information to the AGV 102. For example, the symbols or beacons may be placed on the floor, ceiling, walls, or shelves 116 in the storage area 124. In some implementations, as described in further detail in reference to the example AGVs 202 described in reference to FIGS. 2A-2E, an AGV 102 may have an optical or radio sensor for reading the symbols or beacons, which may thereby be used to determine the location and identification of the symbols or beacons and therefore the AGV 102.

In some implementations, a delivery vehicle 104 may include a computing system that communicates with a delivery coordination server 802 and/or AGV 102, for example, as described in reference to FIG. 8. The delivery vehicle computing system may include an in-dash computing system, tablet computer, smartphone, laptop, vehicle control unit, or other computing device. In some implementations, the delivery vehicle computing system may perform operations of the delivery coordination engine 804 described herein. In some instances, the delivery vehicle computing system may communicate information with an AGV 102 associated with the delivery vehicle 104 (e.g., in the storage area 124 of the delivery vehicle 104). For example, the delivery vehicle computing system and AGV 102 may communicate location, speed, acceleration, current or next delivery, which delivery door to use for a particular delivery, and/or other information.

In some implementations, the delivery vehicle computing system may include or communicate with a location system, such as a global positioning system device (GPS), an accelerometer, or another device capable of determining the location of the vehicle. For example, the delivery vehicle computing system may determine and transmit location information for a particular upcoming delivery to the AGV 102, so that the AGV 102 can prepare an item for delivery in response to a given trigger (e.g., within a defined range, time period, etc., from a delivery destination). In another example, the delivery vehicle computing system may provide speed, location, acceleration, or other context information to the AGV 102, in response to which, the AGV 102 may cease moving, secure an item that it is manipulating, or otherwise secure itself in place using a stabilizing mechanism, for example, as described in reference to FIG. 6.

An AGV 102 is an automated guided vehicle or robot that may be configured to autonomously manipulate items, for example, for use with a delivery vehicle 104, as described herein. In some implementations, the AGV 102 may be a robot or material handling equipment inside a delivery vehicle 104 to move items around. In some implementations, the AGV 102 may use (e.g., be guided by, be stabilized by, or use for navigation) a rail, track, or other guiding or stabilizing mechanism mounted to the floor, wall, or ceiling of the delivery vehicle 104, for example, as described in reference to FIG. 3.

The AGV 102 may include a drive unit adapted to provide motive force to the AGV 102, a guidance system adapted to locate the AGV 102 in the delivery vehicle 104 and/or another operating environment (e.g., outside the delivery vehicle 104), and an IHM 216 (e.g., as described in reference to FIGS. 2A-2E). For example, the IHM 216 of an AGV 102 may retrieve an item from a shelf 116, pallet 126, or other location, transport the item, manipulate the item, and/or place the item at a designated location, such as on a shelf 116 in a delivery vehicle 104, near a door of a delivery vehicle 104, or at a delivery point. Example implementations of AGVs 102 are described in further detail in reference to FIGS. 2A-2E.

In some implementations, as illustrated in FIG. 1A, an AGV 102a may travel down the center of a delivery vehicle 104a with shelves 116 flanking it on both sides. For instance, the AGV 102a may run along a rail, track, or other stabilizing mechanism guiding it within the delivery vehicle 104a in the aisle 120.

The delivery coordination engine 804 may use computer logic to coordinate execution of tasks among the components of the delivery coordination system 800. For example, the delivery coordination engine 804 may control execution of tasks by AGV(s) 102, a human worker (e.g., via a client device 810), and/or a delivery vehicle 104. In some instances, the delivery coordination engine 804 may also communicate with a computing system of a warehouse, store, or fulfillment center where a delivery is being performed in order to notify the receiving destination of the delivery. Details of the operations of the delivery coordination system 800 are described in further detail in reference to the flowcharts herein, for example.

In some implementations, the AGV 102 or an item displacement mechanism may move the item on the shelf 116 to make room for additional items on the shelf 116. For instance, as described in reference to FIG. 4, a shelf 116 (e.g., a shelving unit 402 or shelf 406) may include an item displacement mechanism that moves items to designated locations (e.g., deeper in the shelf 116) to make room for more items. For instance, the mechanism may include a motor coupled with a belt or rollers, a gear driven by the AGV 102 which then drives the rollers, or simple rollers across which the AGV 102 can push (or pull) an item, although it should be understood that these implementations are provided as examples.

As illustrated in FIG. 1A, an AGV 102a may travel down a center aisle 120 in the storage area 124 of a delivery vehicle. As illustrated in FIG. 1B, an AGV 102b may travel down a side (e.g., in an off-center aisle in the storage area 124) of a delivery vehicle 104b with the shelf(ves) 116 to one side. As illustrated, the AGVs 102a and 102b may run along a rail, track, or other stabilizing mechanism guiding it within the delivery vehicle 104b. In some implementations, another AGV (not shown 102) may coordinate with the AGV 102a or 102b to unload the delivery vehicle 104b. As illustrated an AGV 102b or 102c, as illustrated in FIGS. 1B and 1C, may travel down the right side of the delivery vehicle 104b or 104c in order to retrieve items from shelving and place them to the right side of the delivery vehicle 104b or 104c (e.g., at a side door 122 or at a right side of a back door of the delivery vehicle 104b or 104c), so that a delivery person retrieving the item from the delivery vehicle 104b or 104c would be further from traffic on a roadway at the left of the delivery vehicle. It should be noted that this may be reversed, for example, for right-hand drive cars or for other design constraints.

Example AGVs 102 are described in further detail in reference to FIGS. 2A-2E, although, it should be understood that these implementations are provided by way of example and that other implementations are possible and contemplated herein. It should also be noted that the operations described in reference to FIGS. 1A-1C are provided by way of example and that other implementations are possible and contemplated herein.

FIGS. 2A-2E are illustrations of example AGVs 202 according to some implementations described herein. FIG. 2A depicts an example AGV 202a, which may include an AGV body 210, a drive unit 212 housed within or coupled to the body 210, a power source (not shown) housed within or coupled to the body 210, a stability mechanism (or interface 228 for a stability mechanism), an IHM 216, a guidance system (not shown), and one or more controllers (not shown), although other configurations are possible and contemplated herein. Depending on the implementation, some or all of the features and operations of the example AGVs 202a, 202b, 202c, and 202d discussed in reference to FIGS. 2A-2E may be interchanged, omitted, duplicated, or replaced. For example, a feature discussed in reference to the example AGV 202a in FIG. 2A may be used with the AGV 202b in FIG. 2B, or a feature discussed in reference to the example AGV 202b in FIG. 2B may be used with the example AGV 202a in FIG. 2A. Further, some features may be described in reference to one of the figures herein (e.g., FIGS. 2A-2E), but not the other figures in order to simplify the description and reduce repetition, although they may be applicable to some or all of the figures.

The body 210 may include a front, a rear opposing the front, a left side extending from the front to the rear, and a right side opposing the left side and extending from the front to the rear. While various shapes and construction materials to the body 210 are possible, the body 210 may be configured to fit between rows of shelving in a delivery vehicle 104, between shelving and a wall of the delivery vehicle 104, etc. The body 210 may be configured to house a drive unit 212, power source, controller, and/or other components of the AGV 202a.

The drive unit 212 may be coupled to the body 210 and configured to receive power from the power source to provide motive force to the AGV 202a and propel the AGV 202a within an operating environment. In some implementations, the drive unit 212 may receive instructions from one or more controllers instructing the drive unit 212 to cause the AGV 202a to move forward, backward, sideways, turn, or perform another movement. In some implementations, the drive unit 212 may include electric motors and wheels, although other configurations, such as treads are possible. In some implementations, the drive unit may include wheels configured to roll along rails or a track in the delivery vehicle 104, thereby improving stability and the ability of the AGV to locate itself.

The drive unit 212 may be wirelessly coupled via a controller to a wireless interface and a wireless communications network to receive control signals from the delivery coordination engine 804 and/or other components of the system 800. In some implementations, the drive unit 212 may be controlled as described in elsewhere herein, which may be executed using a distributed computing system comprising AGVs 202, servers (e.g., the delivery coordination server 802), controllers, etc., for example, as shown in the system depicted in FIG. 8.

The power source may be coupled to the components of the AGV 202a to provide power to the components, for example, the power source may provide power to the IHM 216, the drive unit 212, a controller, or another component of the AGV 202a. The power source may include a battery, a wire, contact track (e.g., integrated with the stability mechanism or otherwise in the delivery vehicle 104 or operating environment), induction charger, alternator or gas generator, etc.

The item handling mechanism or IHM 216 may include a carrying device 226 and, in some instances, a robotic device (e.g., an elevator 208, adjustable platform 218, robotic arm, etc.) that moves the carrying device 226 to, for example, retrieve items from a first location and transport them to a designated location in a delivery vehicle 104 (e.g., on a shelf 406). In some implementations, the IHM 216 may also be configured to retrieve items from shelves 406 in a delivery vehicle 104 and place them adjacent to a door in the delivery vehicle 104, etc., as described elsewhere herein.

In some implementations, the IHM 216 may include a robotic arm, platform 218, or other device for extending a carrying device 226 from an AGV 202 to a storage shelving unit 402 that is separate from the AGV 202. In some implementations, the IHM 216 may be configured so that a carrying device 226 fits next to a shelf 406 when the AGV 202 is at a point proximate to the shelf 406, so that a carrying device 226 does not need to be extended to interact with an item on the shelf 406. In some implementations, the IHM 216 may have one, two, three, or more degrees of freedom to move the carrying device 226 along one, two, three, or more axes thereby allowing the IHM 216 to retrieve an item from a first location, such as on a shelf 406, and place the item at a target location. Similarly, in some instances, the IHM 216 may be configured to retrieve an item from a shelf 406 and place it at a second location, such as adjacent to a door or on a platform in the delivery vehicle 104 for retrieval by a delivery person or delivery AGV.

In some implementations, the IHM 216 may include a mast having an elevator 208 coupled with the body 210. The elevator 208 lifts and lowers a platform 218 supporting a carrying device 226. The elevator 208 moves the IHM 216 along a Z axis to lift and set down the item.

In some implementations, a platform 218 extends or retracts the carrying device 226 horizontally between the AGV 202a and a shelving unit 402, delivery point, or delivery vehicle door. In some implementations, the platform 218 may also extend or retract the carrying device 226 into or out of one or more of AGV shelves 214 (e.g., as in the example AGV 202c illustrated in FIG. 3C) to place an item on one of the AGV shelves 214.

In some implementations, the platform 218 and/or carrying device 226 may include a set of rollers or a conveyor belt that, when stationary, hold an item in a stationary position on the AGV 202. The rollers or conveyor belt may turn, thereby moving an item sideways (e.g., in a Y direction) relative to the direction of motion of the AGV 202 and into the shelves 406 in a delivery vehicle, for example.

In some implementations, the IHM 216 includes a moveable platform 218 supporting a carrying device 226 and capable of translating the carrying device 226 along a plane in one, two, or more dimensions and/or rotating about a vertical axis. For example, the platform 218 (or other component of the IHM 216, depending on the implementation) may translate the carrying device 226 along X and/or Y coordinates (e.g., sideways/left and right relative to the front of the AGV 202a; forward and backward relative to the front of the AGV 202a; etc.).

In some implementations, the platform 218 may comprise two platforms coupled to one another, a first of which moves along a first horizontal axis and a second of which moves along a second horizontal axis perpendicular to the first horizontal axis. For instance, the first platform may be coupled with the elevator 208 and the second platform, so that the first platform may move the second platform along the first horizontal axis and/or rotate the second platform. The second platform may be coupled with the first platform and the carrying device 226, so that the second platform may move the carrying device 226 along the second horizontal axis.

In some implementations, the platform 218 may be configured to rotate a carrying device 226, such as the forks or rollers, so that the carrying device 226 may extend or be extended about a horizontal plane, as described above. For instance, the carrying device 226 may extend and then retract along a first horizontal axis to retrieve an item, as described above. Once the carrying device 226 has retracted, the platform 218 may rotate the carrying device 226, so that it may be extended along a second horizontal axis, for example, to place the item on a shelf 406, whether on the AGV 202, as described in reference to FIG. 2C, or in the delivery vehicle 104.

In some implementations, the IHM 216 may include a carrying device 226 in the form of forks, which may extend outward from the AGV 202 to interface with an item, for example, in a shelving unit 402, and may be retractable, so the forks may be placed at any desired height and maneuvered underneath an item and to lift the item from a shelving unit 402 during extraction of the item from the shelving unit 402 or placement of the item in the shelving unit 402.

In some implementations, the IHM 216 may include a robotic arm, which moves a carrying device 226. The robotic arm may pivotable or otherwise articulable to extend the carrying device 226 in order to lift the item from a first location, transport it to a designated location, and place it at the designated location. The elevator 208 may raise or lower the robotic arm to interact with various shelves 406 of a shelving unit 402.

In some implementations, the AGV 202a may include a scanner coupled with the carrying device 226, platform 218, or body 210, etc., that can read signatures or markers to determine locations of scanned objects. For example, the scanner may be an optical scanner configured to read visual identifiers (e.g., labels including a QR code, bar code, etc.) to determine with which shelf 406 (or an AGV shelf 214) the IHM 216 or the carrying device 226 is aligned. The optical scanner may scan a marker on a shelf 406 or other location in the delivery vehicle 104, for example. The shelf marker may indicate a position and/or identification of a shelf, for example.

In some implementations, the elevator 208 may include positional sensors to determine the position of IHM 216 and/or to align the carrying device 226 with a target shelf 406 (whether an external or integrated with the AGV 202, such as an AGV shelf 214).

The carrying device 226 may be coupled to or integrated with the IHM 216 and is configured to support and/or move one or more items. In some implementations, the carrying device 226 is connected at a distal end of the IHM 216. The carrying device 226 may be movable by the IHM 216 vertically, for instance. The carrying device 226 may be extendable by the IHM 216 using the range of motion to retrieve a certain item from a loading area, shelf 406, other AGV 202, etc., and place the item at a second location within reaching distance of the IHM 216.

In some implementations, the carrying device 226 may include or have attached thereto, components such as forks, a surface that may extend under an item, arms that may extend to the sides of an item to pinch or otherwise grasp the item, a crane with a claw device to lift an item, a clamp arm, motorized rollers, a conveyor belt, one or more suction cups, rollers, etc., or a combination of two or more such components. For example, a carrying device 226 may include rollers and a suction cup, the suction cup extending (e.g., on an arm) from the carrying device 226 into a shelving unit 402 to pull an item from the shelving unit 402 and onto the rollers of the carrying device (or, in some instances, push the item from the carrying device onto the shelving unit 402). The suction cup may be powered by a compressor on the AGV 202 or on the delivery vehicle 104 (e.g., feeding the suction cup through a tube coupling the delivery vehicle 104 with the suction cup and/or AGV 202). The carrying device 226 may be made of any material, such as plastic or metal, which is sufficiently strong to support an item.

In some implementations, a controller of the AGV 202 may determine attributes of an item to be picked up by the carrying device 226 and use those attributes to more accurately handle the item. For instance, the controller may read a label and/or communicate with the delivery coordination engine 804 to determine dimensions and/or weights of the item thereby allowing the controller to determine, for example, a grip or suction force, or a position of the item on the carrying device 226.

In some implementations, the carrying device 226 or another component (e.g., the body 210, platform 218, or elevator 208) of the AGV 202 may include an item displacement mechanism interface that interacts with a corresponding item displacement mechanism on a shelving unit 402 to move items between a near and far side of the shelving unit 402 thereby improving the ability of a shelf 406 in the shelving unit 402 to store multiple items deep while still allowing items to be easily retrievable by the AGV 202. For instance, the item displacement mechanism interface on the AGV 202 may exert force on or otherwise signal an item displacement mechanism on the shelving unit 402 to push one or more items toward or away from the AGV 202. In some implementations, the shelving unit(s) 402 in a delivery vehicle 104 may include a plurality of item displacement mechanisms in order to move some items on the shelving unit 402 without moving all of the items on the shelving unit 402. For instance, one or more sections of one or more shelves 406 may have an item displacement mechanism.

In some implementations, the item displacement mechanism interface may include a gear coupled with the carrying device 226 that turns a gear causing a device (e.g., an item displacement mechanism) coupled with the gear to push the item toward or away from the AGV 202. For instance, the gear may turn a conveyor belt, rollers, a screw-drive assembly, etc., to push or pull the item within the shelving unit 402.

Figure 4:
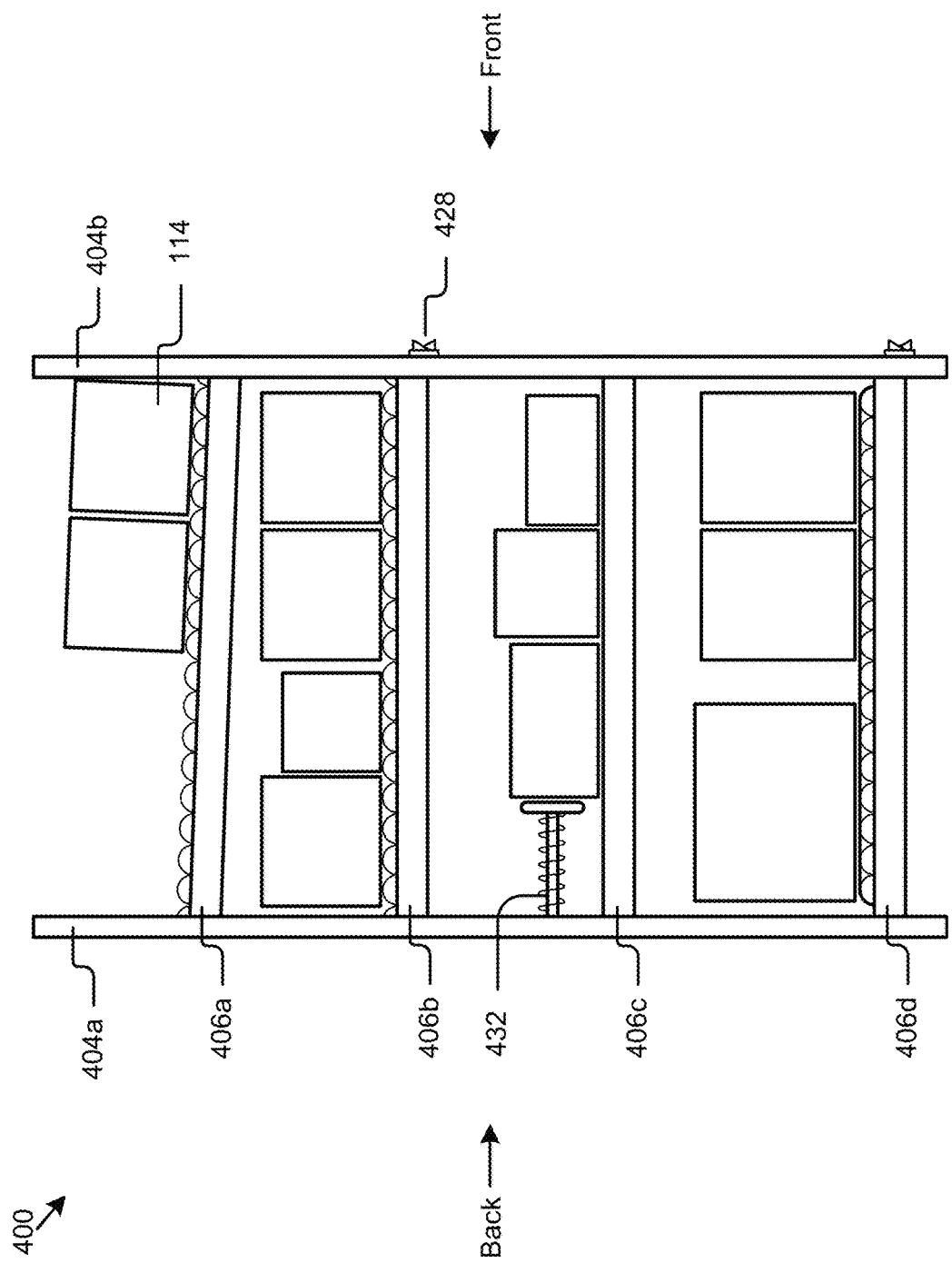
FIG. 4 is an illustration of an example shelving unit for use in a delivery vehicle with an automated guided vehicle.

In some implementations, the item displacement mechanism interface may signal or power a motor coupled with an item displacement mechanism (e.g., a conveyor belt, rollers, a screw-drive assembly, etc., e.g., as discussed in reference to FIG. 4). For instance, the item displacement mechanism interface may wirelessly transmit a signal to a computing device coupled with the shelving unit 402 (e.g., in the shelving unit 402 or the delivery vehicle 104), which in turn causes the computing device to actuate the item displacement mechanism. In some implementations, the item displacement mechanism interface may include one or more electrical contacts that, when contacting corresponding contacts on the shelving unit 402, sends a signal or provides power to a motor of the item displacement mechanism, thereby causing the item displacement mechanism to move one or more items.

The AGV 202a may include a guidance system that determines a location of the AGV 202a within an operating environment (e.g., the delivery vehicle 104 or other operating area). For instance, the guidance system may include one or more sensors that detect and process navigation markers (e.g., QR codes, RFID labels, etc.) to locate the AGV 202a while the AGV 202a traverses the operating environment. The guidance system may be coupled to a controller of the AGV 202a, which may, in some instances, include local object detection intelligence and processing to avoid collision with other objects (e.g., AGVs 202, humans, items, storage shelving units 402, etc.) in the operating environment.

In some implementations, the guidance system of the AGV 202 may include an accelerometer, GPS sensor, cellular radio, etc., to determine its location, acceleration, velocity, etc. In some implementations, the guidance system or controller of the AGV 202 may be communicatively coupled with the delivery vehicle 104 computing system to receive acceleration, location, velocity, etc., information from the delivery vehicle computing system. As discussed elsewhere herein, the AGV 202 may use this information to secure itself or an item that it is manipulating during acceleration and/or motion of the delivery vehicle 104.

The AGV 202a may include one or more controllers coupled with the guidance system, IHM 216, drive unit 212, delivery coordination engine 804, etc., to perform operations described herein. For instance, the one or more controllers may receive a signal from the delivery coordination engine 804 and, in response, may signal the drive unit 212 to propel the AGV 202a. The one or more controllers may communicate with the guidance system to determine a location of the AGV 202a within the operating environment and, using the drive unit 212, navigate through the operating environment. For example, the one or more controllers may receive a signal from the delivery coordination engine 804 indicating to retrieve a particular item from a retrieval location, such as a loading area, conveyor mechanism, shelf 406, etc., in response to which, the one or more controllers may instruct the drive unit 212 to position the IHM 216 adjacent to the retrieval location using the current location determined by the guidance system and then direct the IHM 216 to retrieve the item, for example.

In some implementations, the AGV 202 may include a stability mechanism interface 228 that couples with a stability mechanism in the delivery vehicle 104 to secure the AGV 202 to the delivery vehicle 104. The stability mechanism and stability mechanism interface 228 are described in further detail in reference to FIG. 3.

Figure 2B:
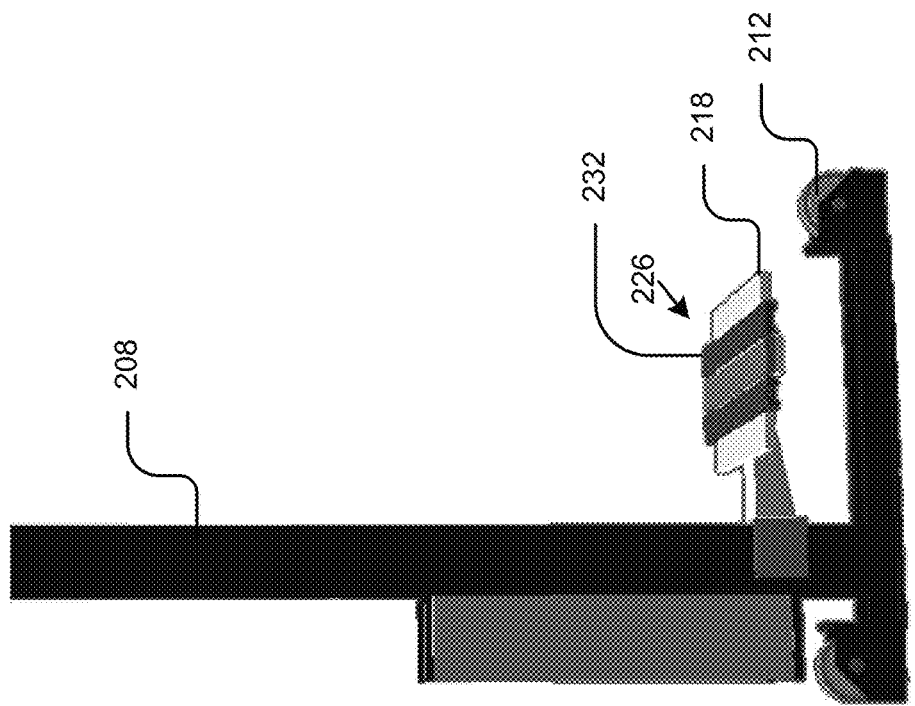

FIG. 2B illustrates an example AGV 202b for placing and retrieving items in a delivery vehicle 104. The example AGV 202b (e.g., a drive unit 212 or stability mechanism interface 228 of the AGV 202) may be attached or otherwise coupled, via a track, rail, etc., to the floor, wall, or ceiling of the delivery vehicle 104 to provide stability to the AGV 202b. For instance, the drive unit may couple with a railing in the floor of the delivery vehicle 104, which railing may serve as the stability mechanism or component thereof. Accordingly, the AGV 202 may move along the railing (e.g., as illustrated in example delivery vehicles 104a and 104b in FIG. 1). It should be noted that, although only a single rail is illustrated in FIG. 1, two or more rails may be used. For instance, the floor, wall, and/or ceiling of the delivery vehicle 104 may include one or more rails.

In some implementations, the railing may provide power (e.g., electrical current) to the AGV 202. In some instances, the railing may include a pulley or cable system for pulling the AGV 202 back and forth within the delivery vehicle 104. In some instances, the drive unit 212 may include one or more wheels that run along a railing thereby keeping the AGV 202b stable within the delivery vehicle 104 and, in some instances, providing power to or improving the ability of the AGV 202b to locate itself within the delivery vehicle 104.

The example AGV 202b may also include an elevator 208, platform 218, and carrying device 226, as described above. As illustrated in FIG. 2B, the carrying device 226 may include a carrying surface 232, which may slide perpendicular to the direction of movement of the AGV 202b. For example, the carrying surface 232 may slide toward a loading area (e.g., on a shelf 406) and, depending on the implementation, slide under an item to lift it from the loading area, lift the item from the loading area (e.g., by the elevator 208 lifting the carrying surface 232), and then retrieve the carrying surface 232 with the item from the loading area. The same processes may also be used to place the item on shelves 406 during loading or shuffling of items.

Figure 2C:
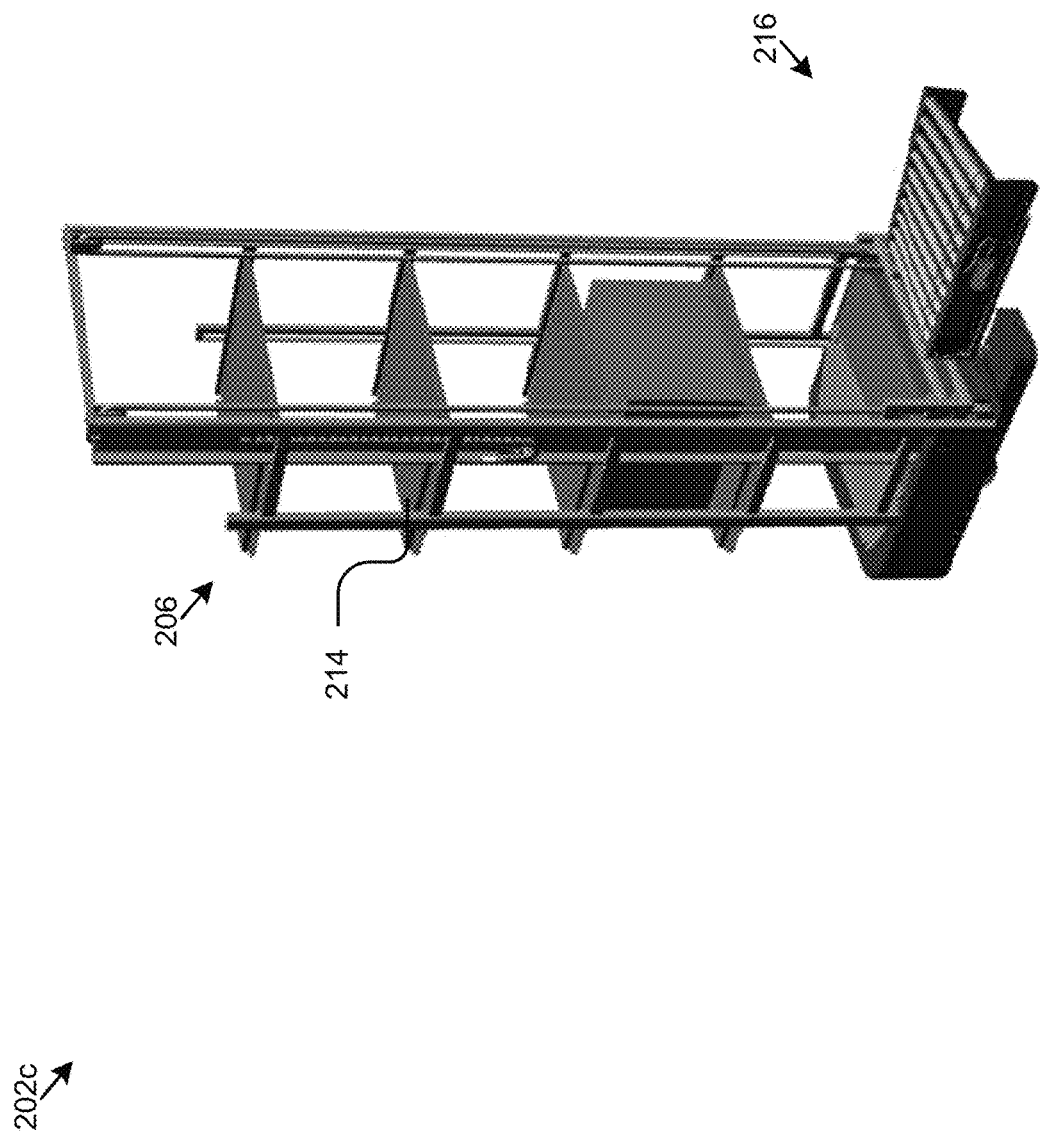

FIG. 2C describes another example AGV 202c with AGV item storage rack 206 with one or more AGV shelves 214. The example AGV 202c may be used outside of the delivery vehicle 104 to bring items to the delivery vehicle 104, may be used both inside and outside of the delivery vehicle 104, or used solely inside the delivery vehicle 104, for example. As illustrated, the AGV 202c may include an AGV item storage rack 206 with a plurality of shelves arranged vertically. The IHM 216 may also include a mast having an elevator 208 and a platform 218, which may be raised or lowered using the elevator 208. The platform 218 may extend the carrying device 226 along a first direction toward the AGV rack 206 or, perpendicularly to the first direction, toward a storage shelving unit 402 adjacent to the AGV 202, depending on the implementation.

Some implementations of the AGV 202 may include an AGV item storage rack 206 (also referred to as AGV rack 206), such as illustrated coupled with the example AGV 202c. While the AGV rack 206 is illustrated as coupled to the top of the body 210, other configurations are possible, for example, the AGV rack 206 may be coupled in front of, behind, to the side of, or even towed or pushed by the AGV 206. The AGV rack 206 may be positioned proximate to the IHM 216, so that the shelves 214 are within reach of the IHM 216 for the IHM 216 to place items on or retrieve items from the shelves 214.

The AGV rack 206 may include a single shelf 214 or a plurality of shelves 214 coupled to a frame. The shelves 214 may include flat surfaces, bays, containers, or other mechanisms for holding an item. Where equipped, a shelf 214 may be capable of storing the item during transit of the AGV 202.

The plurality of shelves 214 may be vertically arranged and, in some implementations, one or more of the shelves 214 may have an adjustable height (e.g., adjusted manually or automatically using a motor coupled with the AGV 202c) on the AGV rack 206. In some implementations, a controller of the AGV 202c may determine a current height of a particular shelf of the plurality of shelves 214 (or, for instance, a loading area, item, or other shelves 406), for example, using an optical scanner or retrieving a stored height of a particular shelf from a database. For example, one or more of the shelves 214 may include a marker readable by an optical scanner coupled with the IHM 216 or carrying device 226 to indicate to the IHM 216 a location or identification of the a particular shelf. In some implementations, a controller of the AGV 202c may store a shelf identifier for a shelf 214 in association with a height or size of the shelf 214, or an identifier of an item stored on the shelf 214.

In some implementations, a shelf 214 onto which an item is placed may be selected based on the size, height, weight capacity, or other attributes of the shelf 214. For example, an item of a given size may be placed on a shelf 214 having a corresponding size. In another example, in response to an item having a threshold weight, it may be placed on a lower shelf 214 than an item having a lighter weight than the threshold.

It should be noted that, although scanning, adjusting, selecting, etc., are described in reference to the AGV shelves 214 in the AGV rack 206, the same processes and mechanisms may be used with the shelves 406 described in reference to FIG. 4, for example.

Figure 2D:
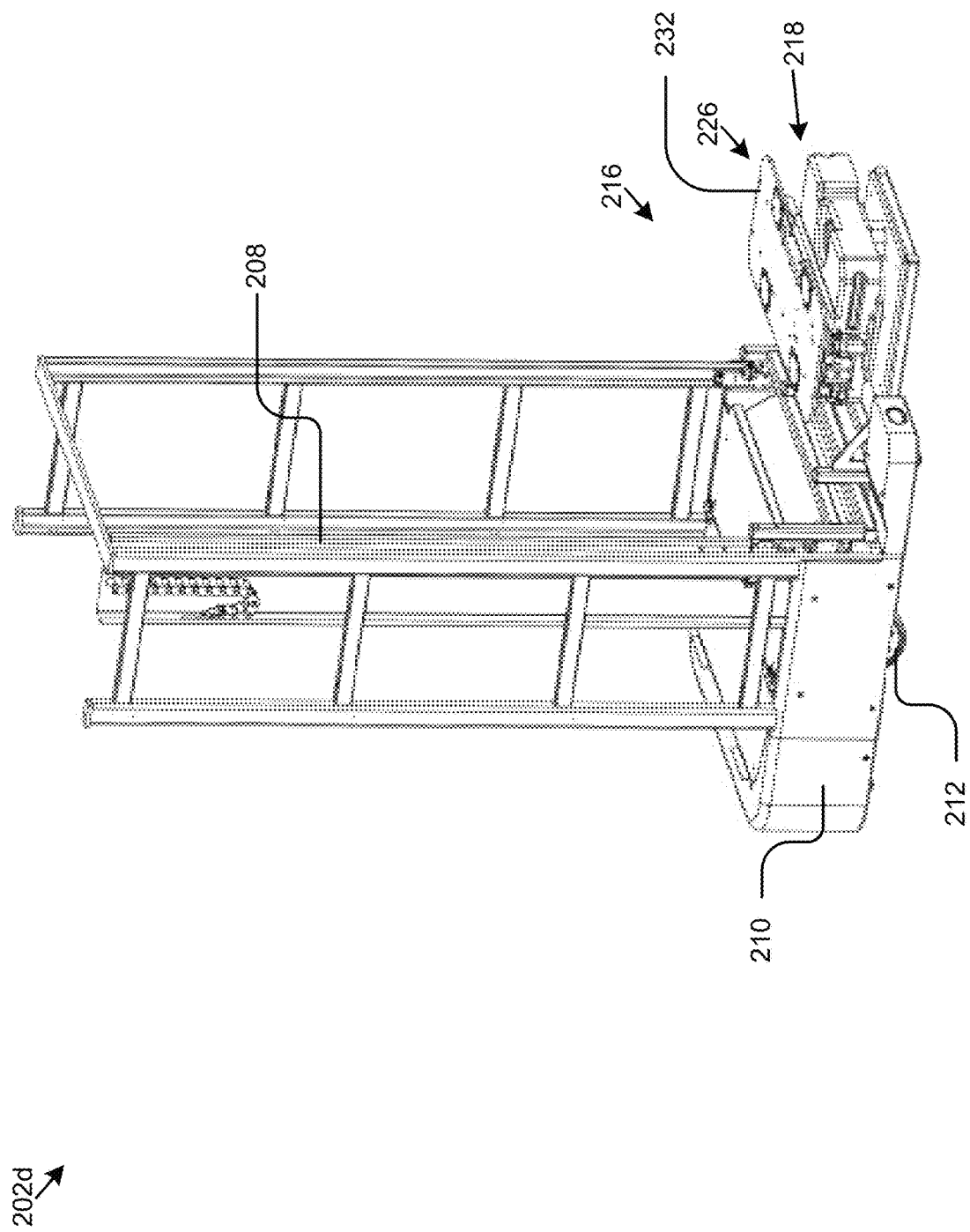
Figure 2E:
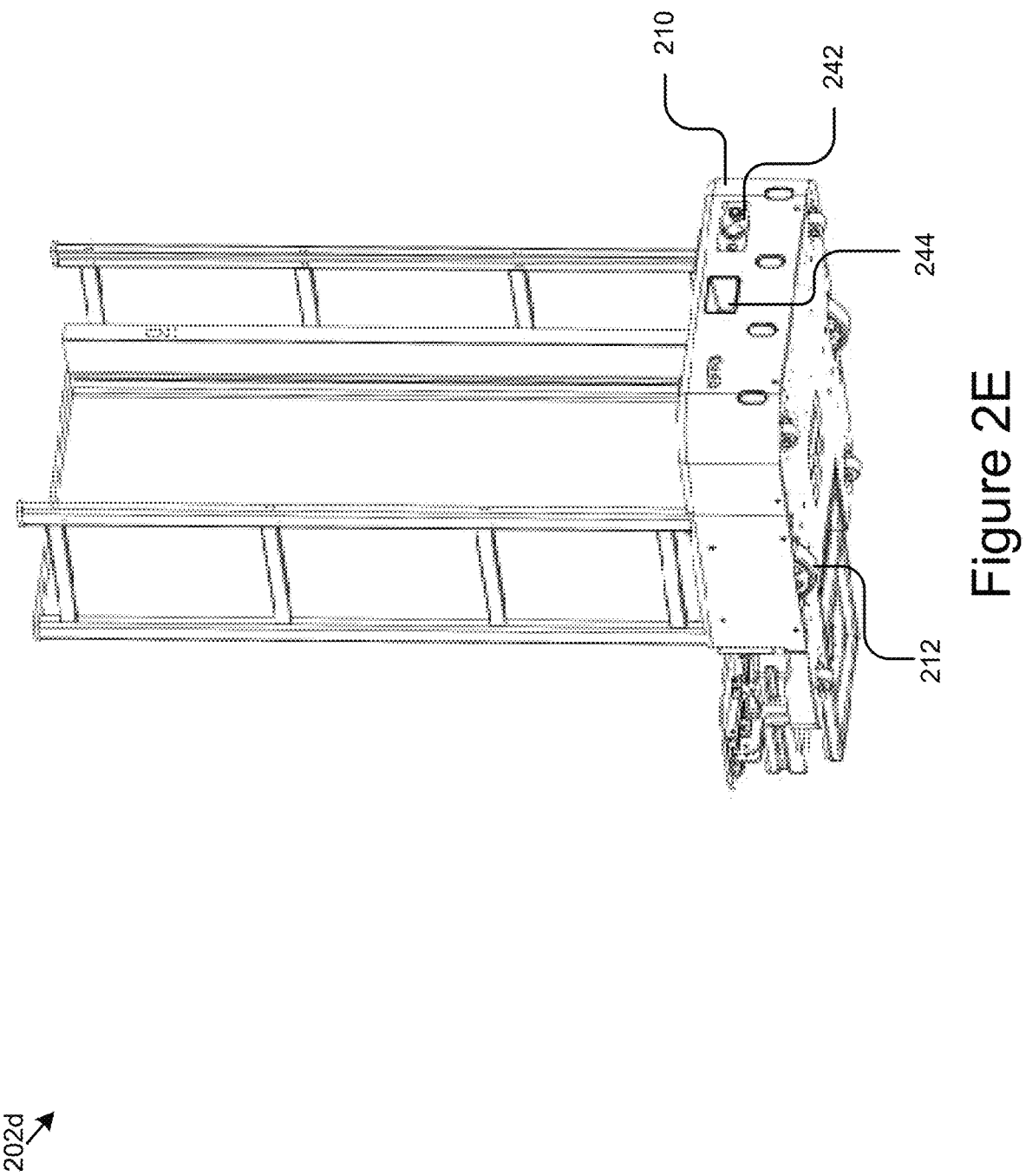

FIGS. 2D and 2E describe another example AGV 202d with an AGV body 210, drive unit 212, elevator 208, and IHM 216. The IHM 216 of the example AGV 202d may include a carrying device, platform 218, and carrying surface 232. The example AGV 202d may be used outside of the delivery vehicle 104 to bring items to the delivery vehicle 104 or transport items from the delivery vehicle 104, may be used both inside and outside of the delivery vehicle 104, or used solely inside the delivery vehicle 104, for example. In some implementations, as illustrated in FIG. 2E, the AGV 202d may include a connection point 242 on the body 210 for one or more of a compressor, power, or electronic signal, as described above (e.g., the connection point 242 may be electronically coupled with a controller, IHM 216, drive unit 212, or other component of the AGV 202d). In some implementations, the AGV 202d may include an optical sensor 244 on the body 210, IHM 216, etc., which allows the AGV 202d to locate itself and/or an item, for example, using a surface of the delivery vehicle 104, a marker in an operating environment, and/or a label on an item.

FIG. 3 is an illustration 300 of an example stability mechanism for use with some implementations of AGVs 102 and delivery vehicles 104. Implementations of the stability mechanism may include, for instance, a coupling or guiding device, such as rails, tracks, hooks, cables, and/or other mechanisms for securing the AGV 102 to the delivery vehicle 104, either continuously or in response to a certain trigger. For instance, the AGV 102 may include a stability mechanism interface for interacting with a stability mechanism of the delivery vehicle 104, thereby securing the AGV 102 to the delivery vehicle 104. For example, the stability mechanism of delivery vehicle 104 may include a hook or French cleat half attached to a wall (or a shelving unit 402) to which a stability mechanism interface, such as a second hook, loop, ring, second French cleat half, may attach. The rails, hooks, cables, etc., may be on the floor, ceiling, and/or wall(s) of the delivery vehicle 104. Use of stability mechanisms, such as the example provided in FIG. 3, may be described in further detail in reference to FIG. 6.

For example, the example stability mechanism illustrated in FIG. 3 may include a first rigid member 334 coupled with a wall 336 of the delivery vehicle 104. For instance, the wall 336 may be a front wall on the interior of the storage area 124 of the delivery vehicle 104, although other implementations are possible. The first rigid member 334 may represent a rail, hook, or French cleat half, for example, that is coupled with the wall 336.

The example stability mechanism interface illustrated in FIG. 3 may include a second rigid member 328 coupled with a moveable component 316 of an AGV 102. The second rigid member 328 may represent a rail, hook, or French cleat half, for example, that may connect with the first rigid member 334. For instance, the second rigid member 328 may be coupled with a movable component 316, such as a carrying device 226, a platform 218, or an elevator 208, and the moveable component 316 may move the second rigid member 328 until it couples with the first rigid member 334 to secure the AGV 102, for example, as described elsewhere herein.

In some implementations, the AGV 102 may use the stability mechanism interface to secure itself to the delivery vehicle, so that when the delivery vehicle moves, the AGV 102 does not tip, slide, roll, etc., around the interior of the delivery vehicle 104.

Figure 6:
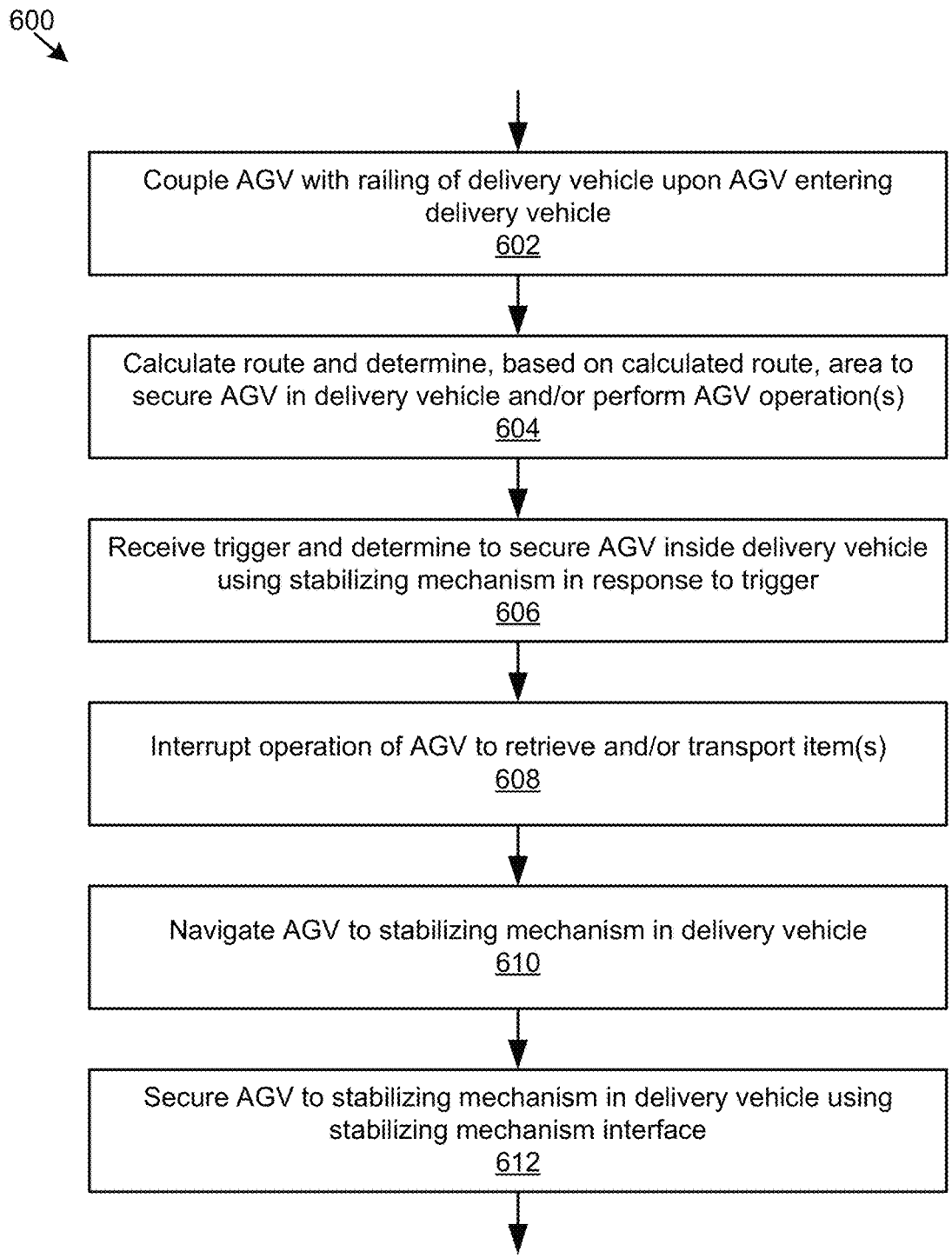
FIG. 6 is a flowchart of an example method for securing the AGV in a delivery vehicle.

In some implementations, the AGV 102 may use location, acceleration, velocity, or delivery vehicle 104 information, for example, in combination with certain triggers to actively secure itself to the delivery vehicle 104, as described in further detail in reference to FIG. 6. For instance, the AGV 102 may receive data from the delivery vehicle 104 indicating that the delivery vehicle 104 has started, is moving at a given velocity, has entered a freeway onramp, etc., in response to which the AGV 102 (or the delivery vehicle 104, depending on the implementation) may use a stability mechanism to prevent unintentional movement of the AGV 102 and/or items that the AGV 102 may be carrying (e.g., by lowering a carrying device 226, tightening a grip by the carrying device 226 on the item, etc.).

FIG. 4 is an illustration of a cross section an example shelving unit 402, which may be used in a delivery vehicle 104 and with an AGV 102. In some implementations, the shelving unit 402 may include one or more support members 404a . . . 404b, such as poles, beams, planks, etc., which are attached to and provide support to shelves 406. In some implementations, the shelving unit 402 may include several shelves 406a . . . 406d vertically arranged on the support members 404 in order to create a plurality of levels of the shelving unit 402 from which items can be stored or retrieved by an AGV 102. In some implementations, the shelves 406 may be supported by a wall of the delivery vehicle 104 in place of or in addition to the support member(s) 404.

It should be noted that the shelving unit 402 in FIG. 4 is illustrated as a two dimensional cross section from a side of the shelving unit 402 and the depth, width, height, etc., of the shelving unit 402 can be adjusted based on the size and shape of the delivery vehicle 104, items, or other design constraints. Although the item is illustrated in FIG. 4 as a carton 114, it should be understood that an item may be any physical object. The example features, components, numbers of components, and configuration of the shelving unit 402 shown and described in reference to FIG. 4 are provided by way of example and should not be construed as limiting as other implementations are possible and contemplated in this description.

In some implementations, a shelf 406, portion of a shelf 406, shelving unit 402, etc., may include a marker (not shown) identifying the shelf 406. For instance, a section of a particular shelf 406 may include a label on the front of the shelf 406. As described above, an AGV 102 may include a scanner coupled with the carrying device 226, platform 218, etc., that can read signatures or markers to identify the shelf and/or determine its location. For example, the scanner may be an optical scanner configured to read visual identifiers (e.g., labels including a QR code, bar code, etc.) to determine with which shelf 406 the carrying device 226 is aligned.

In some implementations, the shelves 406 may include dividers that prevent items from sliding across the shelf 406 (e.g., from side to side). For instance, a divider may include a partition running between a back side and a front side of a shelf 406 such that an item resting on the shelf 406 would contact the partition rather than slide across the shelf 406. A section of a shelf 406 may be separated from other parts of the shelf 406 by partitions and be individually identifiable by the AGV 102 or identified in a database 820. In some instances, various sections may have various widths, depths, or heights, thereby accommodating different sized items. The size of the sections of the shelves 406 may be used when sorting items to various locations in the delivery vehicle 104.

The shelves 406 in the shelving unit 402 may be level or sloped and may, in some implementations, include features for facilitating movement of items across the shelf 406, such as an item displacement mechanism. For example, an item displacement mechanism of a shelf 406 may include rollers (e.g., as illustrated in the example shelves 406a, or 406b), a conveyor belt (e.g., as illustrated in the example shelf 406d), or a smooth top surface (e.g., as illustrated in the example shelf 406c) for facilitating movement of items between the front and the back of the shelf 406. It should be noted that these features are described by way of example and not limitation and that other implementations are possible and contemplated herein.

In some implementations, one or more of the shelves 406 may be partial. A partial shelf 406 may extend only partially underneath an item or have one or more indents, gaps, or channels, so that a carrying device 226 may more easily fit under the item to lift the item from the partial shelf 406.

In some implementations, the shelves 406, shelving unit 402, and or item displacement mechanism may include active or passive features for moving items within the shelving unit 402 to allow multiple items deep to be stored on and retrieved from a shelf 406. For example, a passive feature of a shelf 406 may be that the shelf 406 is sloped to cause items to slide to the front of the shelf 406 (e.g., as illustrated in the example shelf 406a). However, because roads or parking lots may be uneven and a delivery vehicle 104 in motion may experience variable external forces (e.g., due to acceleration, braking, turning, etc.), other mechanisms may be used in addition or in place of sloping the shelf 406. For instance, an active feature of the shelving unit 402 may apply a force to an item(s) on a shelf 406 to move the item. It should be noted that a shelf 406 may have zero or multiple features for moving items, for example, a shelf 406 may have both active and passive features for moving items.

For example, in some implementations, a shelf 406 may be sloped toward a front of the shelving unit 402, where items may be loaded into the shelving unit 402 (e.g., by an AGV 102), such as is illustrated at shelf 406a. For example, the slope of the shelf 406a may be such that an item with a given coefficient of friction may slide from a back side (e.g., proximate to a wall of a delivery vehicle 104) to a front side (e.g., proximate to an AGV 102 or aisle 120) using the force of gravity. In some implementations, a top surface of a shelf 406 may be constructed of a material, such as metal or plastic, and/or have a coating (e.g., Teflon®, graphite, etc.) such that a coefficient of friction of the top surface in combination with the angle of the slope allows items to slide to the front of the shelving unit 402 using the force of gravity. In some implementations, the angle of the slope may be increased (e.g., to be steeper) to accommodate for a tilt of the delivery vehicle 104 on an uneven road or parking lot.

In some implementations, a shelf 406 (e.g., as in example shelves 406*a* and 406*b*) may include rollers to facilitate movement of an item passively due to a slope, such as that of example shelf 406*a*, and/or actively, due to application of a force (e.g., as described below). It should be noted that, in order to conform to shapes of delivery vehicles 104, limitations in IHM 216 articulation constraints, various sized or shaped items, etc., some implementations of shelves 406 may be level or even slope downward away from the front of the shelving unit 402 (e.g., opposite to that shown in shelf 406*a* in FIG. 4). Similarly, the spacing of the shelves 406 may be variable to accommodate various sized items on different shelves 406, which may be used in assigning items to locations in the shelves 406, for example, as described in reference to FIG. 7.

In some implementations, a shelf 406 may have a non-powered item displacement mechanism, such as a spring 432 that pushes or pulls items between the back and the front of the shelf 406. For example, a spring (e.g., metal, pneumatic, etc.) or similar mechanism may be built into the shelf 406, rollers (e.g., a roller could be spring loaded), a conveyor belt, the shelving unit 402 itself, or the delivery vehicle 104 adjacent to the shelf 406. For example, a spring 432 could be compressed (or stretched) when items are placed on a shelf 406, thereby keeping items at the front of a shelf 406 (e.g., as with the items on shelf 406*c*). In some implementations, a mechanism, similar to the example spring 432 may be powered using a motor, linear motor, pneumatic chamber, etc., which may be used to push or pull items on the shelf.

In some implementations, an item displacement mechanism on a shelf 406 or shelving unit 402 may include a motor that drives rollers, a conveyor, or other pushing or pulling mechanisms (e.g., a linear motor, auger, worm gear, spiral coil, chain assembly, etc.) in order to move items across the shelf 406, although other mechanisms, such as pneumatic chambers, may be used. A powered item displacement mechanism may be include a power source, for example, provided by the delivery vehicle 104, AGV 102, or a battery coupled with the shelves 406.

In some implementations, the AGV 102 may include an electrical contact on an IHM 216, platform 218, carrying device 226, body, etc., that may connect with a corresponding contact on a shelf 406 or shelving unit 402 thereby powering a motor of an item displacement mechanism. In some instances, a shelf 406 or shelving unit 402 may include multiple item displacement mechanisms and the specific placement of the electrical contacts or a signal transmitted by the AGV 102 (or another component of the delivery coordination system 800 wirelessly and/or via the electrical contacts) may specify which item displacement mechanism to activate and therefore which item(s) to move on the shelf 406.

In some implementations, the item displacement mechanism may include a mechanical coupling input device 428 for receiving a mechanical force (e.g., torque), which may cause the item displacement mechanism to move items on a shelf 406. The mechanical force may be received via a corresponding mechanical coupling output device of an AGV 102 or delivery vehicle 104. For instance, the AGV 102 may include a motor driving a mechanical coupling output device, which in turn drives a mechanical coupling input device of a shelf 406. A mechanical coupling input device 428 or output device may include a clutch plate, pinion, cogwheel, or other gear or mechanism for transferring force between a supplying device and the item displacement mechanism. For example, the AGV 102 may include a corresponding mechanical coupling output device for interacting with a mechanical coupling input device 428 of an item displacement mechanism. The mechanical coupling output device may be attached to an IHM 216, platform 218, carrying device 226, body 210, etc.

In some implementations, the mechanical coupling (e.g., the input and output devices) may turn a roller, conveyor, or other pushing or pulling mechanisms, as discussed above. As an illustrative example of using the mechanical coupling, an AGV 102 may lift a carrying device 226 to a shelf 406, extend the mechanical coupling output device until the mechanical coupling output device is matched to the mechanical coupling input device 428. The AGV 102 may turn or otherwise apply force to the mechanical coupling, which is mechanically coupled with the item displacement mechanism to move the item backward or forward on the shelf 406.

Figure 5:
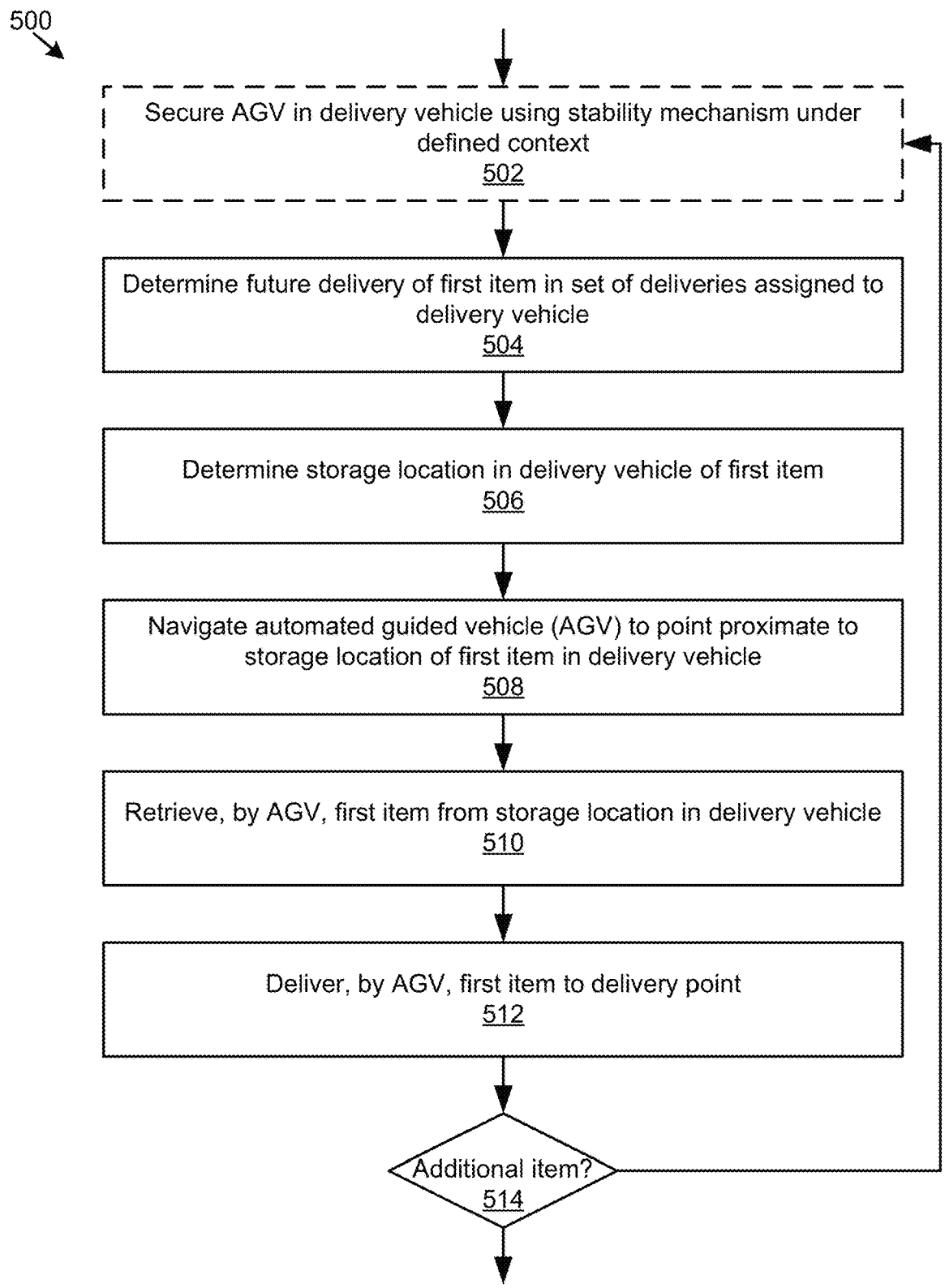
FIG. 5 is a flowchart of an example method for automated preparation of deliveries in delivery vehicles using an AGV.

FIG. 5 is a flowchart of an example method 500 for automated preparation of deliveries in delivery vehicles 104 using an AGV 102. The deliveries may be of orders having one or more items that are to be delivered to one or more delivery destinations. In some instances, a delivery coordination engine 804 may receive data concerning orders/deliveries assigned to the delivery vehicle 104, for example, the data may include identification of items in each delivery, attributes of the items, delivery addresses, delivery or profile attributes (e.g., geographic location, layout, delivery door of a delivery vehicle 104 associated with the delivery, etc.), or other information. It should be noted that one or more of the operations of the method 500 may be performed, for example, while the delivery vehicle is in transit (e.g., navigating a route from a first location to a second location, stopped at an intersection or in traffic, moving a given speed, etc., as described in further detail below).

In some implementations, the delivery coordination engine 804 may transmit a signal(s) identifying deliveries, items, item attributes, delivery vehicles 104 104, storage locations in delivery vehicles 104, etc., to one or more delivery vehicles 104 or AGVs 102. Other information such as identification of a delivery point, location in a delivery vehicle 104, time window for the items to be at designated locations, routing directions, priority, item dimensions, etc., may also be transmitted in the signal to the components of the delivery coordination system 800.

In some implementations, at 502, the AGV 102 may secure itself in a delivery vehicle 104 using a stability mechanism based on a trigger and/or signal from delivery vehicle 104 or delivery coordination engine 804. For example, the stabilizing mechanism may be adapted to impede movement of the AGV 102 within the delivery vehicle 104. The AGV 102 may include a stabilizing mechanism interface that interacts with the stabilizing mechanism of the delivery vehicle 104 to stabilize the AGV 102 during, for example, acceleration of the delivery vehicle 104. In some instances, the AGV 102 may secure itself under a defined context. An example stabilizing mechanism and process for using the stabilizing mechanism are described elsewhere herein, for example, in reference to FIGS. 3 and 6.

At 504, the delivery coordination engine 804 may determine a future delivery of a first item in the set of deliveries assigned to the delivery vehicle 104. For example, the delivery coordination engine 804 may determine the next delivery in a set or sequence of deliveries and may also determine one or more items associated with the determined delivery. In some implementations, the delivery coordination engine 804 may determine an entry from among a plurality of entries in a database. Each entry may represent a delivery and may include various attributes of the delivery, as described elsewhere herein. For example, a delivery entry may represent the future or next delivery.

In some implementations, delivery coordination engine 804 may use the delivery locations (e.g., destinations, points, addresses, geographic locations, etc.) of the set of deliveries assigned to the delivery vehicle 104 to calculate a route through the delivery locations and/or may receive a calculated route from another computing device. The delivery coordination engine 804 may determine, based on the route through the delivery locations/destinations, a sequence of deliveries. For example, each item in the set of items may be associated with a delivery destination, which may be a geographic location along the route. The sequence of deliveries may be determined based on a route through the delivery destinations.

In some instances, the delivery coordination engine 804 may also determine a sequence of items within each delivery, for example, to define the sequence of items retrieved at each delivery location by the AGV 102, when the deliveries have multiple items. For example, items for a particular delivery may be ordered based on various factors, such as proximity to a delivery door of the delivery vehicle 104, depth within a shelf 406 of the delivery vehicle 104 (e.g., items at a front of a shelf 406 may be retrieved and staged, such as described in reference to 508-512, before items further back in the shelf 406), etc.

The sequence of deliveries may be used to determine a subsequent delivery (or item in a delivery), for example, based on completion of a previous delivery. In some implementations, the delivery coordination engine 804 may register a delivery as complete based on receiving a signal from a client device 810, AGV 102, or delivery vehicle 104. For example, a driver of a delivery vehicle 104 may mark a delivery as completed on a graphical interface of a client device 810 or a computing device of the delivery vehicle 104; the AGV 102 may mark a delivery as complete based on delivering (e.g., as described at 512-514) an item to a delivery point, or a computing device of the delivery vehicle 104 may signal that a delivery is complete based on departure from the delivery location (e.g., the delivery vehicle 104 may transmit a signal to the delivery coordination engine 804 that the delivery vehicle 104 is moving or is a threshold distance from the delivery location).

In some implementations, determining the delivery from a set of deliveries assigned to the delivery vehicle 104 may include receiving location data from a computing system of the delivery vehicle 104 (or the guidance system of the AGV 102), and determining, based on the location data, the future delivery from the set of deliveries based on the delivery vehicle 104 being within a defined threshold distance from a location of the future delivery. For instance, a delivery may have a threshold distance associated therewith and, when the delivery vehicle 104 and/or AGV 102 is within the threshold distance, the AGV 102 may determine the delivery and, in some instances, items in the delivery. For example, when the AGV 102 is within one tenth of a mile from the delivery location, the AGV 102 may determine that the delivery at the delivery location is the next/future delivery.

In some implementations, the delivery coordination engine 804 may determine a delivery destination of a first item based on item data associated with the first item. In some implementations, the delivery and/or items there in may have associated a delivery point and/or geographic location.

At 506, the delivery coordination engine 804 may determine a storage location in the delivery vehicle 104 of a first item in the delivery vehicle 104. For instance, the AGV 102 may determine a storage location of an item on a shelf 406 in the delivery vehicle 104. In some implementations, the storage location may be transmitted to the AGV 102 from a delivery coordination engine 804, delivery coordination server 802, delivery vehicle 104, client device 810, etc., or the AGV 102 may retrieve the storage location from a database stored on the AGV 102, delivery coordination server 802, client device 810, etc.

In some implementations, the delivery coordination engine 804 may receive and/or have access to a layout (e.g., in a database accessible to the delivery coordination engine 804) of the delivery vehicle 104 including a storage location at which items are located in the delivery vehicle 104. For instance, the storage location may include an area, shelf 406, location on a specific shelf 406, etc., at which a particular item is stored in the delivery vehicle 104. In some implementations, an AGV 102 loads items into the delivery vehicle 104 and saves (or loads items based on storage locations) the storage locations to a database. In some implementations, shelf identifiers are scanned as items are loaded on to the corresponding shelves, thereby linking items with their storage locations in a database. It should be noted that other implementations are possible and contemplated herein.

In some implementations, items are assigned to locations in the delivery vehicle 104 based on the order in which they are received by the AGV 102. For example, the AGV 102 may place items received at the back of shelves 406 beginning at the front of the delivery vehicle 104 and moving toward the back of the delivery vehicle 104. Accordingly, in some implementations, a determined storage location may include a depth on a shelf 406, for instance.

At 508, the AGV 102 may navigate to a point proximate to the storage location of the first item in the delivery vehicle 104. In some implementations, the AGV 102 may navigate during transit of the delivery vehicle 104 along a route through delivery destinations of the set of deliveries. For example, the AGV 102 may navigate to a point/location adjacent to the storage location of the item such that the IHM 216 of the AGV 102 may retrieve the item from the storage location (e.g., directly or using an item displacement mechanism of a shelf 406). For example, a point proximate to the storage location may be a position that is within the range of movement of the IHM 216 to retrieve the item from the storage location. The proximate point may be at a defined offset to the storage location of the item or to a shelf 406 on which the storage location is found, for example, based on the range of motion of the IHM 216.

In some implementations, the AGV 102 may determine its location within the operating environment, such as the delivery vehicle 104, using a guidance system and navigate from a first location to a second location in the operating environment. As discussed in further detail above, the guidance system may include sensors that detect and process navigation indicators or markers to locate the AGV 102 as it traverses the operating environment. For example, the guidance system may include an optical scanner on a body of the AGV 102 that reads visual markers (e.g., QR codes) on a floor of the operating environment. In some implementations, the guidance system may include laser-based guidance systems, such as LIDAR (light imaging, detection, and ranging). A controller of the AGV 102 may look the visual marker up in an accessible database, such as the map data 822.

In some implementations, the AGV 102 may follow a track, series of guidance system markers (e.g., QR codes on the ground), etc., to navigate between its current location and the point proximate to the storage location. For example, a guidance system of the AGV 102 may read navigation markers and follow them until a destination defined by the delivery coordination engine 804 (e.g., by a task or task list provided by the delivery coordination engine 804) is reached.

In some implementations, such as where the AGV 102 is mounted to a track or rail in the delivery vehicle 104, the AGV 102 may navigate to a position longitudinally along the track or rail to be adjacent to the storage location of the item.

In some implementations, the autonomous navigation may be performed according to routing instructions in a task list computed by the delivery coordination engine 804. In some instances, the task list may include the storage location of the item and the AGV 102 may automatically navigate, for example, by following the guidance system markers to the storage location or point proximate to the storage location. In some implementations, the delivery coordination engine 804 may define the details of the navigation, such as the guidance system markers, directions, movements, etc., of the AGV 102, and provide the details to the AGV 102.

In some implementations, an AGV 102 may move down a length of an aisle 120 with shelving units 402 on one or both sides of the aisle 120 (e.g., as described and illustrated in FIGS. 1A-1C) and then stop in front of a shelving unit 402 where the storage location is located. In some instances, the AGV 102 may be positioned such that the left side or the right side of the AGV 102 faces a face of the assigned (e.g., of the storage location of the item) shelving unit 402 (e.g., at a section or position of the shelving unit 402 within the range of motion of the IHM 216).

At 510, the AGV 102 may retrieve the first item from the storage location in the delivery vehicle 104. In some implementations, the AGV 102 may retrieve the item during transit of the delivery vehicle 104 along a route for delivering the set of deliveries. The AGV 102 may retrieve one or more items according to a task and/or task list determined by the delivery coordination engine 804, for instance.

In some implementations, a scanner (e.g., optical, radio, etc., as described elsewhere herein) of the AGV 102 may scan a label on the item, which label may contain an identification code identifying the item, so that the AGV 102 can identify the item during retrieval. For example, it may be advantageous to identify the item in case a determined storage location is incorrect or if the item has shifted during transit of the vehicle. In some implementations, if the item is incorrect, the AGV 102 may systematically scan items moving outward from the determined storage location to find the item and, if the item is not found, the AGV 102 may perform an operation, such as transmitting a notification to the client device 810 of a driver of the delivery vehicle 104.

Figure 7:
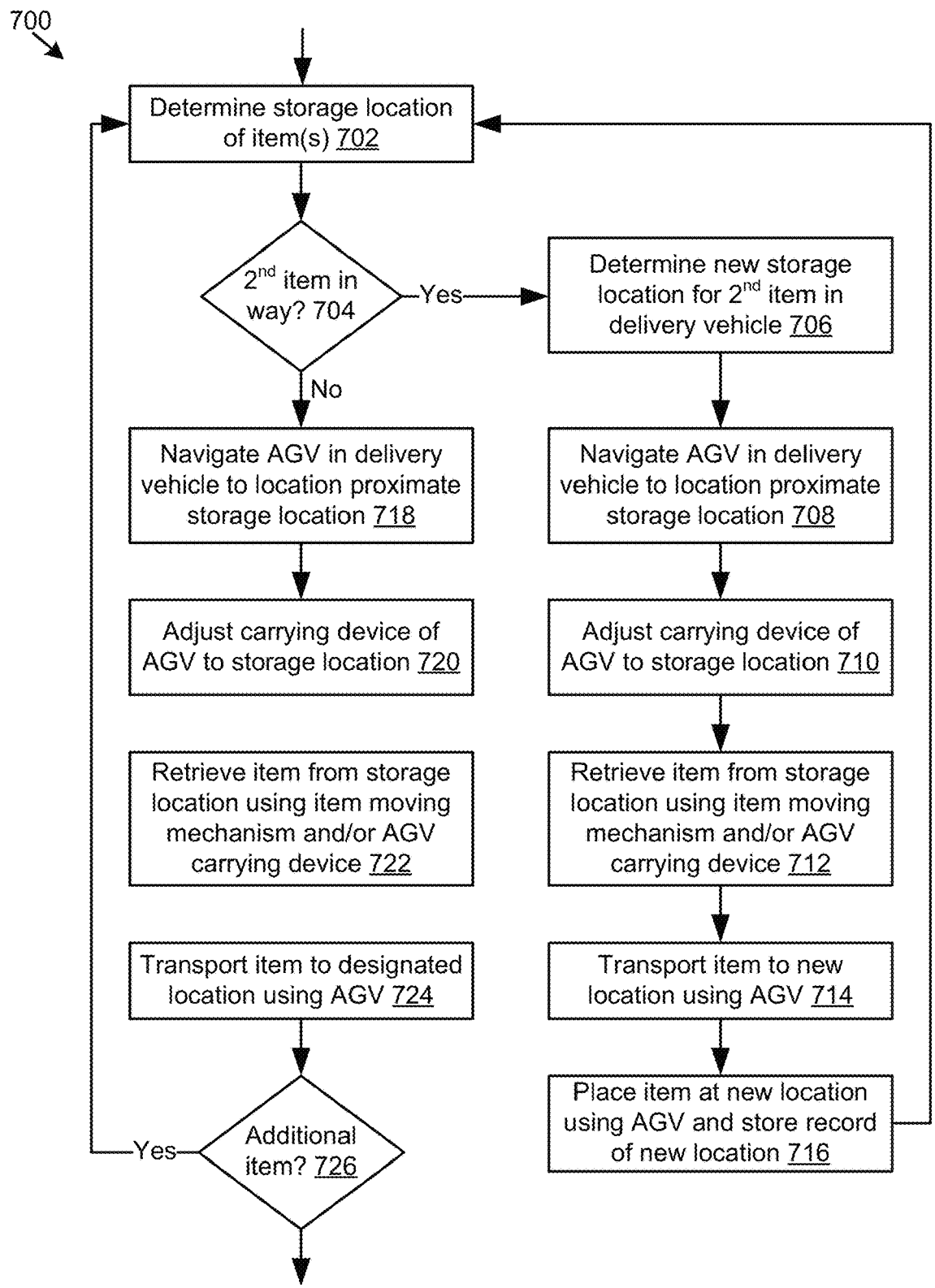
FIG. 7 is a flowchart of an example method for retrieving items from a storage location in a delivery vehicle using the AGV.

Example operations for retrieving items from storage locations in the delivery vehicle 104 are described in reference to FIG. 7.

At 512, the AGV 102 may deliver the first item to a delivery point. In some implementations, the delivery point may be located within the delivery vehicle 104, such as at a designated location next to a door of the delivery vehicle 104. In some implementations, the AGV 102 may deliver the item to the delivery point during transit of the delivery vehicle 104 along a route for delivering the set of deliveries.

In some implementations, delivering the item to the delivery point includes determining a delivery door from a plurality of doors of the delivery vehicle 104 based on the delivery door being associated with the future delivery, and navigating the AGV 102 to the delivery point using the delivery door, the delivery door being determined using attributes of the delivery stored in a database accessible to the delivery coordination engine 804. For example, a delivery/delivery point may have a door of the delivery vehicle 104 associated therewith. Accordingly, in some instances, the delivery coordination engine 804 and/or AGV 102 may determine a delivery door and/or delivery point associated with a delivery location of an item/order and may transport the item to the delivery door and/or delivery point. For example, a delivery at a roadside or parking lot location, may be associated with a side door of the delivery vehicle 104; a delivery point at drone loading station (e.g., which drone may then transport the item to its final delivery destination) may be associated with a top door of the delivery vehicle 104; a delivery point for a delivery at a door dock may be associated with a back door of the delivery vehicle 104; etc.

In some implementations, the delivery point may be exterior to the delivery vehicle 104, for example, the AGV 102 may navigate outside of the delivery vehicle 104 to deliver the item(s). For example, delivering the first item to a delivery point located outside of the delivery vehicle 104 may include navigating the AGV 102 from the inside of the delivery vehicle 104 to the delivery point.

In some implementations, the AGV 102 may be configured to travel into and out of the delivery vehicle 104. For example, the AGV 102 may be configured with wheels that are large enough to travel across a threshold of the door (e.g., a back door at a door dock) of the delivery vehicle 104. The guidance system of the AGV 102 may include optical sensors, sonar (sound navigation and ranging), radar (radio detection and ranging), LIDAR, GPS, a remote control, etc., to enable the AGV 102 to navigate external to the delivery vehicle 104. For instance, the AGV 102 may autonomously navigate to a given delivery point external to the delivery vehicle 104, follow a delivery person (e.g., a driver of the delivery vehicle 104), or be remotely controlled by a user of a client device 810, a delivery driver, etc.

In some implementations, delivery of the item may include transporting the item to the delivery point and waiting for retrieval of the item, for example, by a delivery person, customer, or another AGV 102. For example, the AGV 102 may leave the item on a carrying device 226 of the IHM 216, while the AGV remains at the delivery point, and may sense removal of the item (e.g., based on a weight change, optical sensor, or user input). In some implementations, the IHM 216 of the AGV 102 may automatically adjust the height of the carrying device 226 to match that of the determined delivery point, for example, it may raise or lower the carrying device 226 to make retrieval of an item from a door of the delivery vehicle 104 easier.

In some implementations, delivery of the item may include placing the item at the delivery point using the IHM 216 of the AGV 102, and the AGV 102 may leave the item at the delivery point and then navigate to the storage location (e.g., a point proximate to the storage location) of the next item in the for delivery, or the AGV 102 may navigate to the stabilizing mechanism to secure itself, as described above. For example, in some implementations, at 514, the AGV 102 and/or the delivery coordination engine 804 may determine if there is another item for delivery (e.g., in a current or future delivery), in which instance, the method 500 may return to 502 and/or 504 to prepare the AGV 102 for transit of the delivery vehicle 104 and/or retrieval of the next item.

In some implementations, when entering the delivery vehicle 104, the AGV 102, using optical sensors, components of the guidance system, etc., may align with rails (e.g., as described above) in the delivery vehicle 104 so that the AGV 102 is stabilized using rails or track in a delivery vehicle 104 during transit of the delivery vehicle 104.

FIG. 6 is a flowchart of an example method 600 for securing the AGV 102 in a delivery vehicle 104. As described in further detail in reference to FIG. 3, the security mechanism may include mechanisms, such as rail(s), track (s), hook(s), etc., which may impede unintended movement of the AGV 102 due to acceleration of the delivery vehicle 104 in one or more directions. It should be noted that the operations of the method 600 are provided by way of example and additional or fewer operations may be included, or the order of one or more operations may be changed.

In some implementations, at 602 the AGV 102 may couple with a railing, track, etc., of a delivery vehicle 104, for example, when the AGV 102 enters the delivery vehicle 104. For instance, as described above, a delivery vehicle 104 may include one or more tracks attached to a floor, wall, ceiling, shelving, etc., of the delivery vehicle 104 and the AGV 102 may include a corresponding interface (e.g., wheels, a track, etc.) for interfacing with the tracks. Accordingly, the AGV 102 may be secured, while also allowing it to move within the delivery vehicle 104.

In some implementations, at 604 the delivery coordination engine 804 may calculate a route and determine, based on the calculated route, one or more areas of the route in which the AGV 102 may move, secure itself in place, perform other security operations (e.g., lowering a carrying surface, ceasing movement, moving to a back, front, or side of the delivery vehicle 104, etc.), or perform other operations. For instance, a route through deliveries (e.g., a previous delivery and a future delivery, a set of deliveries assigned to a delivery vehicle 104, etc.) may be calculated or otherwise determined. Attributes of the calculated route or sections thereof, such as distance traveled, time traveled, time required to prepare each delivery and/or items in the delivery (e.g., as described in reference to FIGS. 5 and/or 7), slope of roads traveled, projected acceleration, geographic location(s) of points along the route, speeds traveled, turns, projected traffic, etc. In some implementations, the delivery coordination engine 804 may determine, based on the attributes, an area of the route, such as a time period, portion of the route, geographic locations, or other features, etc., in which the AGV 102 is to perform particular operations. For instance, the delivery coordination engine 804 may determine areas of a route, threshold distances, threshold accelerations, and/or other contexts to trigger operations of the AGV 102, such as navigating the AGV 102 to the point proximate to the storage location, retrieving the first item from the storage location, delivering the first item to the delivery point, or stabilizing itself using a stabilizing mechanism.

In some implementations, at 606 the AGV 102 (and/or the delivery coordination engine 804) may determine or receive a trigger and in response to the trigger, in some instances, determine to secure the AGV 102 inside the delivery vehicle 104 using the stabilizing mechanism. For instance, securing the AGV 102 may be performed by the AGV 102 (and/or the delivery vehicle 104) in response to a defined trigger, such as a threshold acceleration of the delivery vehicle 104, a threshold velocity of the delivery vehicle 104, entrance into or exit from a geographic area by the delivery vehicle 104, etc., for example, as determined above. The trigger may be determined based on sensors of the AGV 102 or data transmitted to the AGV 102 by the delivery coordination engine 804, computing device of the delivery vehicle 104, client device 810, etc., for example.

In some implementations, at 608, the AGV 102 may interrupt its operations to secure itself. For example, the AGV 102 may cease movement, lower its carrying device 226, lower the item, grasp the item more tightly, or perform other operations (e.g., as described herein, such as in 610 and 612), couple with a stabilizing mechanism, couple with rails, for example, in response to certain triggers, such as a threshold acceleration, velocity, location, etc.

In some implementations, at 610, the AGV 102 may navigate to a stabilizing mechanism in the delivery vehicle 104, for example, as described above (e.g., at 508). In some instances, in response to a defined trigger (e.g., the delivery vehicle 104 traveling at a threshold velocity), the AGV 102 may autonomously navigate to a location of a stabilizing mechanism in the delivery vehicle. In some instances, in response to a defined trigger, the AGV 102 may navigate to a location in the delivery vehicle 104, such as a front, back, or side wall where it may be more stable and/or interact with a stabilizing mechanism.

In some implementations, at 612, the AGV 102 may secure to the stabilizing mechanism in the delivery vehicle 104, for example, using a stabilizing mechanism interface, as described in further detail above. For example, securing the AGV 102 may be under the defined context or trigger and may include using a stability mechanism of the delivery vehicle 104 with a stabilizing mechanism interface of the AGV 102 that interacts with the stabilizing mechanism to stabilize the AGV 102, for example, as described above.

FIG. 7 is a flowchart of an example method 700 for retrieving items from a storage location, such as a shelf 406, using the AGV 102. In some instances, the example method 700 also describes example operations for shuffling items in the delivery vehicle 104 by the AGV 102. The operations of the example method 700 are provided by way of example and other operations and mechanisms are possible and contemplated herein. In some instances, a delivery coordination engine 804 or software on a controller of the AGV 102 may direct the AGV 102 to perform some or all of the operations of the method 700.

In some implementations, the method 700 may be triggered in response to an arrival of the delivery vehicle 104 at a geographic point, area of a route, threshold distance from a delivery location, a delivery location, or based on other context, as described above. For instance, the computing system of the delivery vehicle 104 may transmit a signal to the delivery coordination engine 804 or the AGV 102 to indicate the context of the delivery vehicle 104, which may trigger an operation of the method 700. It should also be noted that some operations are described in reference to the delivery coordination engine 804, but may be performed by a component of the delivery coordination engine 804 or another application running on the AGV 102 another component of the system 800.

In some implementations, at 702, the delivery coordination engine 804 may determine the storage location of one or more item(s), for instance, on the shelf 406 as described in further detail above in reference to the operation 506 in FIG. 5. For instance, the delivery coordination engine 804 may determine the storage locations of the next item for delivery and, in some implementations, may also determine the storage locations of one or more items (e.g., including the next item) in the delivery vehicle 104. For example, the delivery coordination engine 804 may determine the storage location of a first item and one or more second items adjacent to, on the same shelf 406 as, near to, or also in the delivery vehicle 104 with the first item.

In some implementations, at 704, the delivery coordination engine 804 may determine if a second item is in the way of the first item, for example, so that the second item would need to be moved to access the first item. For example, a storage location of the second item may be in the way if it is in front (e.g., as indicated in FIG. 4) of a storage location of the first item on a shelf 406. The second item may be determined to be in the way of the first item based on the determined storage locations from the operation at 702 or may be determined based on a sensor of the AGV 102. For example, an optical sensor of the AGV 102 may scan a shelf 406 or storage location of the first item and discover the second item in the way.

In some implementations, in response to determining that a second storage location of a second item is in front of the storage location of the first item (e.g., on a shelf 406 of the delivery vehicle 104, the delivery coordination engine 804 may, at 706, determine a new storage location for the second item in the delivery vehicle 104. For example, the delivery coordination engine 804 and/or the AGV 102 may determine an available new location in the delivery vehicle 104, such as on another shelf 406, a different location on the same shelf 406, a temporary location to which a second item may be shuffled to retrieve a first item, etc.

In some implementations, the delivery coordination engine 804 may determine a sequence of the set of deliveries assigned to the delivery vehicle 104, as described above, and may determine the new storage location for the second item based on the sequence. For instance, the determined storage location may satisfy a constraint that the new storage location is not in front of (e.g., in the way of, as described above) a prior-delivery storage location of a prior-delivery item, which is an item that will be delivered before the second item based on the sequence of deliveries.

In some implementations, when determining the new storage location, the delivery coordination may also use other factors, such as the size, weight, dimensions, priority, etc., of the second item and the size, weight capacity, number of items stored, etc., of the third/new storage location.

In some implementations, at 708, the AGV 102 may navigate to a location proximate to the storage location of the second item in the delivery vehicle 104, for example, as described above in reference to 508 in FIG. 5.

In some implementations, at 710, the AGV 102 may adjust its carrying device 226 based on the storage location. For example, the AGV 102 may raise the carrying device 226 using the IHM 216 (e.g., by the elevator) to so that a top surface of the carrying device 226 is substantially level with a top surface of a shelf 406 or, depending on the implementation, so that the carrying device 226 is at the right position (e.g., height, etc.) to retrieve the second item from its storage location.

For example, the IHM 216 may lift the carrying device 226. For example, the AGV 102 may determine with which storage shelf 406 on a particular shelving unit 402 to align a carrying device 226 (e.g., based on control instructions and/or the storage location received from the delivery coordination engine 804) and may elevate the carrying device 226 to a height based on the height of the storage shelf 406. In some instances, the AGV 102 may raise the carrying device 226 toward the storage shelf 406 and stop once a scanner coupled with the IHM 216 or carrying device 226 of the AGV 102 detects a shelf marker (e.g., a barcode, QR code, etc.). For example, the AGV 102 may use a unique identification code scanned from the marker compared to instructions received from the delivery coordination engine 804 to identify the shelf 406, depending on the implementation.

In some implementations, the AGV 102 may use a shelf identifier associated with a storage location of an item to determine a height of the shelf 406 and may adjust a height of the carrying device 226 along at least a third (e.g., a vertical) axis to place the item on the shelf 406, although other dimensions may also or alternatively be used. In some implementations, the AGV 102 may alternatively or additionally use placement of items, markers, or structure of the shelving unit 402 to determine the coordinates at which to move the carrying device 226.

In some implementations, at 712, the AGV 102 may retrieve the item from the storage location using the item moving mechanism and/or the AGV carrying device 226. In some implementations, the carrying device 226 may support the item directly by engaging with the item, such as by sliding underneath the item, resting underneath the item as it is pushed onto the carrying device 226 by the item moving mechanism, coupling to the sides or front of the item, etc. In some implementations, the item moving mechanism may move the item within the shelf 406 and/or onto the carrying device 226.

In some implementations, the AGV 102 may extend the carrying device 226 toward the shelf 406 and/or above the shelf 406 to retrieve the item. In some implementations, the carrying device 226 may extend into the shelving unit 402 to push the item into the shelf 406 at the appropriate depth to be at the storage location (or, for example, until the item hits the back of the shelf 406 or an item behind it on the shelf 406) or retrieve the item from the depth in the shelving unit 402.

In some implementations, the item displacement mechanism of the shelf 406 may move the item from the storage location on the shelf 406 to the front of the shelf 406, where the carrying device 226 may retrieve the item from the shelf 406 at the front of the shelving unit 402. For instance, the AGV 102 (or the delivery coordination engine 804) may actuate the item displacement mechanism to move the item by, for example, applying a torque to a mechanical coupling, applying a current to an electrical contact, or transmitting signal to the item displacement mechanism, for example, as described in detail in reference to FIG. 4.

In some implementations, at 714, the AGV 102 may transport the item to a new location using the AGV 102. In instances where the new storage location is located within a range of movement of the IHM 216, the IHM 216 may automatically adjust to transport the item, by raising or lowering the carrying device to another shelf 406, for example. In some instances, the AGV 102 may navigate to a location proximate to the new storage location, for example, as described in reference to 708.

In some implementations, at 716, the AVG may place the item at the new storage location and may store a record of the new storage location in a database accessible by the AGV 102 and/or the delivery coordination engine 804.

For example, the AGV 102 may place the item on the shelf 406 using the carrying device 226. For instance, as described in reference to 710 and 712 above, the IHM 216 may move (e.g., lift, lower, etc.) the carrying device 226, align the carrying device 226 with a shelf 406, and place the item on the shelf 406 either directly or using the item moving mechanism.

In some implementations, the AGV 102 may move the carrying device 226 toward the shelf 406 to place an item on top of the shelf 406. For example, the carrying device 226 may move toward the shelf 406 if the carrying device 226 is too far from the shelf 406 to slide the item off the carrying device 226 (e.g., using rollers on the carrying device 226) and directly onto the shelves 406. The IHM 216 (e.g., using the elevator 208) may raise or lower the carrying device 226 to align it above a shelf 406 at the storage location, and then extend the carrying device 226 toward the shelf 406 to set the item on the shelf 406. For example, the IHM 216 may raise the carrying device 226 along at least the third axis until the item is above a particular shelf 406. The IHM 216 may then lower the carrying device 226 along at least the third axis (e.g., the vertical or Y axis) to place the second item on the shelf 406. In some implementations, the AGV 102 may disengage the carrying device 226 from the item once the item is resting on the shelf 406.

In some implementations, the carrying device 226 may extend into the shelving unit 402 to push the item into the shelf 406 at the appropriate depth to be at the storage location (or, for example, until the item hits the back of the shelf 406 or an item behind it on the shelf 406).

In some implementations, the carrying device 226 may place the item onto a shelf 406 at the front of the shelving unit 402 and the item displacement mechanism of the shelf 406 may move the item to the storage location on the shelf 406 (e.g., to a defined depth, to the back of the shelf 406, until the item contacts an item behind it on the shelf 406, etc.), for example, as described in reference to FIG. 4.

In some implementations, upon placing the item on the shelf 406 at the storage location, the delivery coordination engine 804 may store an identifier of the item in association with an identifier of the storage location and/or the shelf 406 in order to recall later where the second item is placed in the delivery vehicle 104.

In some implementations, once the second item has successfully been moved out of the way of the first item, the method may return to 702 or 704, and may determine whether there is an additional item in the way of the storage location of the first item. For example, if there are no items to be shuffled, the method 700 may continue to 718.

In some implementations, the operations at 718-722 may proceed in a similar way to those operations at 708-712, but with the first item. For example, the operation at 718 may be performed as described in reference to 708, the operation at 720 may be performed as described in reference to 710, and the operation at 722 may be performed as described in reference to 712. In some implementations, at 724, the AGV 102 may transport the first item to the designated location, for example, as described in reference to 512 in FIG. 5.

In some implementations, at 726, the AGV 102 may determine whether there is an additional item at a delivery or at a subsequent delivery (e.g., based on a task list, sequence of deliveries, etc., as described above) and, if there is an additional item, may restart the process at 702 for the additional item.

In some implementations, the AGV 102 may retrieve multiple items by stacking the items on top of one another or on AGV shelves 214, as described in reference to the example AGV 202c in FIG. 2C, and, once the items are retrieved and/or the AGV shelves 214 are full, the AGV 102 may transport the multiple items to the designated location.

It should be noted that the method 700 of FIG. 7 may have additional or fewer operations and may be performed with different components or in a different order. Further, some or all of the operations may be repeated as appropriate and/or needed for any suitable number of items.

FIG. 8 is a block diagram of an example delivery coordination system 800 and data communication flow for automated preparation of deliveries in delivery vehicles 104 using AGVs 102. The system 800 may include a delivery coordination server 802, one or more AGVs 102, one or more delivery vehicles 104, a database 820, and/or warehouse equipment 810.

The components of the system 800 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth™ etc.), etc.

The delivery coordination server 802 may, in some implementations, include one or more hardware and/or virtual servers programmed to perform the operations, acts, and/or functionality described herein. The components of the delivery coordination server 802 may comprise software routines storable in one or more non-transitory memory devices and executable by one or more computer processors of the delivery coordination server 802 to carry out the operations, acts, and/or functionality described herein. In further implementations, these routines, or a portion thereof, may be embodied in electrical hardware that is operable to carry out the operations, acts, and/or functionality described herein.

In some implementations, the delivery coordination server 802, or elements thereof, may be integrated with or communicatively coupled with a plurality of AGVs 102. The delivery coordination server 802 may include hardware and software configured to dispatch the AGVs 102, and is coupled for communication the other components of the system 800 to receive and provide data. In some instances, the delivery coordination server 802 may calculate a route to execute tasks considering traffic and resources. In some cases it adjusts the route or the task in order to keep the route optimum. In some implementations, the delivery coordination server 802 may generate a schedule (e.g., a task list) that defines the route and other operations for an AGV 102, as described herein. For instance, the delivery coordination server 802 may instruct an AGV 102 to navigate within a delivery vehicle 104 or other operating environment according to the schedule. The schedule of a plurality of the AGVs 102 may be coordinated such that an optimal flow can be achieved.

The delivery coordination engine 804 may comprise software routines storable in one or more non-transitory memory devices and executable by one or more computer processors to carry out the operations, acts, and/or functionality described herein. In further implementations, these routines, or a portion thereof, may be embodied in electrical hardware that is operable to carry out the operations, acts, and/or functionality described herein. Instances of the delivery coordination engine 804*a* . . . 804*n* may be executed by one or more of the components of the system 800. The delivery coordination engine 804 may be operable on the delivery coordination server 802 (or another component of the system 800) and communicatively coupled to receive data from and transmit data to other components of the system 800, as described elsewhere herein. In some implementations, the delivery coordination engine 804 may be configured to store, retrieve, and/or maintain data in the database 820. In some implementations, the components, features, or functionality of the delivery coordination engine 804 may be distributed among two or more components of the system 800, for example.

The database 820 is an information source for storing and providing access to data. The data stored by the database 820 may be organized and queried using various criteria including any type of data stored by it. The database 820 may include data tables, databases, or other organized collections of data. Examples of the types of data stored by the database 820 may include, but are not limited to map data 822, AGV data 828, location assignment data 824, order data 826, item data 830, vehicle data 832, etc. In some instances, the database 820 may also include conveyor system attributes, delivery destination attributes, sensor data, etc.

The database 820 may be included in the delivery coordination server 802, or in another computing system and/or storage system distinct from but coupled to or accessible by components of the system 800 to store, retrieve, or maintain data in the database 820. In some implementations, the database 820 may be stored in a data store 908, as described in reference to FIG. 9. The database 820 can include one or more non-transitory computer-readable mediums for storing the data. In some implementations, the database 820 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 822 may include data reflecting the 2 or 3 dimensional layout of zones, such as a facility, delivery vehicle 104 and/or other operating environment, for example. In some instances, the map data 822 may include geographic map data, such as delivery areas and routes for delivery vehicles 104. The map data 822 may include data about guidance system markers, such as unique identification codes of the markers and positions of the markers in the layout of the facility, delivery vehicle 104, or other operating environment.

The location assignment data 824 may include data representing available locations in a delivery vehicle 104 that may be assigned to items, such as what locations are available, the dimensions, capacities, 2 or 3 dimensional locations, etc., for example. The location assignment data may also include shelf 406 specific information, such as the height, width, depth, weight capacity, item handling mechanism, shelf identifier, or other information about shelves 406. In some instances, the location assignment data 824 may also include whether and which items are assigned to and/or currently stored in the locations in a particular delivery vehicle 104.

The order data 826 may include data about orders, the quantity and identity of items in orders, delivery destination (e.g., a shipping address) information for orders, customer account information, order priority, progress of order fulfillment, number of cartons in an order, etc.

The AGV data 828 may describe the state of an AGV 102 (operational state, health, location, battery life, storage capacity, items being carried, etc.), whether and to which delivery vehicle 104 it is assigned, current location of an AGV 102, etc.

Item data 830 may describe unique identifiers for items, the location of the items, other attributes of the item (e.g., size, description, weight, quantity of items in a package, color, etc.), item inventory, mapping of items to locations in delivery vehicles 104, item label or marker information, etc.

Vehicle data 832 may represent identification codes identifying specific delivery vehicles 104; routes, items, AGVs 102 associated with delivery vehicles 104, available locations, communication information for communicating with a computing device of the vehicle 104, etc. In some implementations, the vehicle data 832 may include attributes of the delivery vehicle 104, such as its location, acceleration, number and configuration of doors, placement of stability mechanisms, number and configuration of shelves 406 or other storage locations in the delivery vehicle 104, etc.

An AGV 102*a* . . . 102*n* is an automated guided vehicle or robot that may be configured to autonomously transport items, as described in detail above. An AGV 102 may include a computing system (e.g., as in the example provided in FIG. 9) with communication and processing capabilities. For example, the AGV 102 may run the delivery coordination engine 804 or a component thereof, or a computing device of the AGV 102 may communicate with another computing device running the delivery coordination engine 804.

A delivery vehicle 104*a* . . . 104*n* may include a computing system that may communicate with other components of the delivery coordination system 800 and may, in some instances, perform some operations described in reference to the delivery coordination engine 804. For example, a computing system of a delivery vehicle 104 may include the delivery coordination engine 804 or a component thereof. In some implementations, the computing system of the delivery vehicle 104 may transmit information to an AGV 102 associated with the delivery vehicle 104, as described above.

A client device 810 may be communicatively coupled with a component of the delivery coordination system 800, such as a delivery coordination server 802, an AGV 102, or delivery vehicle 104. The client device 810 includes one or more computing devices having data processing and communication capabilities. In some implementations, a client device 810 may include a processor (e.g., virtual, physical, etc.), a memory, a power source, a communication unit, and/or other software and/or hardware components, such as a display, graphics processor, wireless transceivers, keyboard, camera, sensors, firmware, operating systems, drivers, various physical connection interfaces (e.g., USB, HDMI, etc.). The client device 810 may couple to and communicate with other client devices 810 and the other entities of the system 800 via a network (not shown) using a wireless and/or wired connection.

Figure 9:
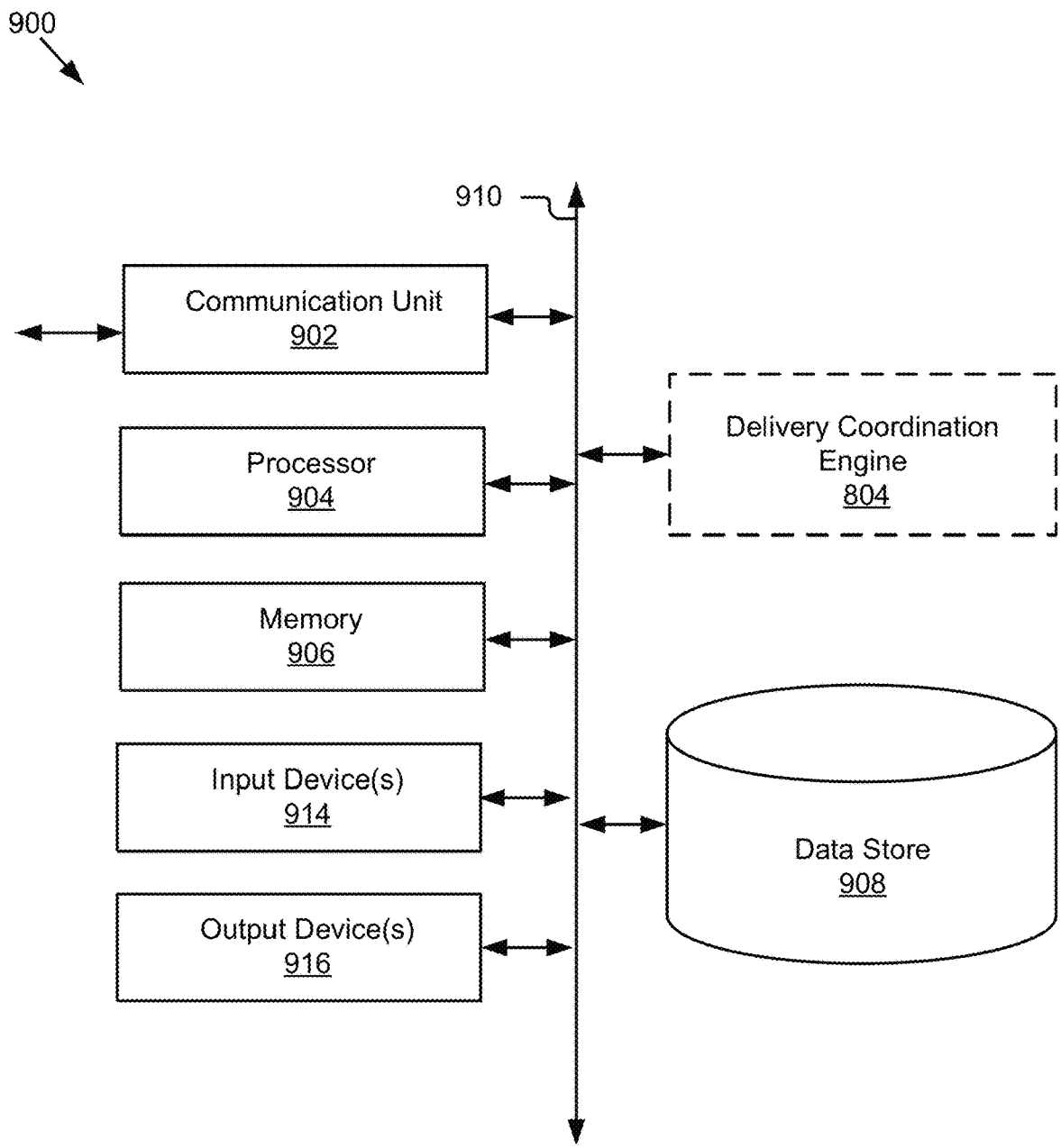
FIG. 9 is a block diagram of an example computing system.

FIG. 9 is a block diagram of an example computing system 900. This computing system 900 may represent the computer architecture of delivery coordination server 802, AGV 102, delivery vehicle 104, delivery vehicle 104, and/or client device 810, as depicted in FIG. 8, and may include different components depending on the implementation being represented.

As depicted in FIG. 9, the computing system 900 may include a delivery coordination engine 804, depending on the configuration. In some implementations, the computing system 900 may store and/or operate other software that may be configured to interact with the delivery coordination engine 804 via a communication unit 902.

The delivery coordination engine 804 may include software including logic executable by the processor 904 to perform its respective operations described herein, although in further embodiments the delivery coordination engine 804 may be implemented in hardware (one or more application specific integrated circuits (ASICs) coupled to the bus 910 for cooperation and communication with the other components of the system 900; sets of instructions stored in one or more discrete memory devices (e.g., a PROM, FPROM, ROM) that are coupled to the bus 910 for cooperation and communication with the other components of the system 900; a combination thereof; etc.).

As depicted, the computing system 900 may include a processor 904, a memory 906, a communication unit 902, an output device 916, an input device 914, and data store(s) 908, which may be communicatively coupled by a communication bus 910. The computing system 900 depicted in FIG. 9 is provided by way of example and it should be understood that it may take other forms and include additional or fewer components without departing from the scope of the present disclosure. For instance, various components of the computing system(s) may be coupled for communication using a variety of communication protocols and/or technologies including, for instance, communication buses, software communication mechanisms, computer networks, etc. While not shown, the computing system 900 may include various operating systems, sensors, additional processors, and other physical configurations. Although, for purposes of clarity, FIG. 9 only shows a single processor 904, memory 906, communication unit 902, etc., it should be understood that the computing system 900 may include a plurality of one or more of these components.

The processor 904 may execute software instructions by performing various input, logical, and/or mathematical operations. The processor 904 may have various computing architectures to process data signals including, for example, a complex instruction set computer (CISC) architecture, a reduced instruction set computer (RISC) architecture, and/or an architecture implementing a combination of instruction sets. The processor 904 may be physical and/or virtual, and may include a single core or plurality of processing units and/or cores. In some implementations, the processor 904 may be capable of generating and providing electronic display signals to a display device, supporting the display of images, capturing and transmitting images, performing complex tasks including various types of feature extraction and sampling, etc. In some implementations, the processor 904 may be coupled to the memory 906 via the bus 910 to access data and instructions therefrom and store data therein. The bus 910 may couple the processor 904 to the other components of the computing system 900 including, for example, the memory 906, the communication unit 902, the input device 914, the output device 916, and the data store(s) 908.

The memory 906 may store and provide access to data by the other components of the computing system 900. The memory 906 may be included in a single computing device or a plurality of computing devices. In some implementations, the memory 906 may store instructions and/or data that may be executed by the processor 904. For example, the memory 906 may store a delivery coordination engine 804 and its respective components, depending on the configuration. The memory 906 is also capable of storing other instructions and data, including, for example, an operating system, hardware drivers, other software applications, databases, etc. The memory 906 may be coupled to the bus 910 for communication with the processor 904 and the other components of computing system 900.

The memory 906 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 904. In some implementations, the memory 906 may include one or more of volatile memory and non-volatile memory (e.g., RAM, ROM, hard disk, optical disk, etc.). It should be understood that the memory 906 may be a single device or may include multiple types of devices and configurations.

The bus 910 can include a communication bus for transferring data between components of a computing system or between computing systems, a network bus system including a computer or portions thereof, a processor mesh, a combination thereof, etc. In some implementations, the various components operating on the computing system 900 (operating systems, device drivers, etc.) may cooperate and communicate via a communication mechanism included in or implemented in association with the bus 910. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 902 may include one or more interface devices (I/F) for wired and wireless connectivity among the components of the system 800. For instance, the communication unit 902 may include various types known connectivity and interface options. The communication unit 902 may be coupled to the other components of the computing system 900 via the bus 910. The communication unit 902 may be electronically communicatively coupled to a network or other components of the system 800 (e.g., by wire, wirelessly, etc.). In some implementations, the communication unit 902 can link the processor 904 to a computer network, which may in turn be coupled to other processing systems. The communication unit 902 can provide other connections to other entities of the system 800 using various standard communication protocols.

The input device 914 may include any device for inputting information into the computing system 900. In some implementations, the input device 914 may include one or more peripheral devices. For example, the input device 914 may include a keyboard, a pointing device, microphone, an image/video capture device (e.g., camera), a touch-screen display integrated with the output device 916, etc.

The output device 916 may be any device capable of outputting information from the computing system 900. The output device 916 may include one or more of a display (LCD, OLED, etc.), a printer, a haptic device, audio reproduction device, touch-screen display, etc. In some implementations, the output device is a display which may display electronic images and data output by the computing system 900 for presentation to a user. In some implementations, the computing system 900 may include a graphics adapter (not shown) for rendering and outputting the images and data for presentation on output device 916. The graphics adapter (not shown) may be a separate processing device including a separate processor and memory (not shown) or may be integrated with the processor 904 and memory 906.

The data store(s) are information source(s) for storing and providing access to data, such as the database 820 and/or data described in reference to the database 820. The data stored by the data store(s) 908 may organized and queried using various criteria including any type of data stored by them, such as the data described in reference to the database 820 in FIG. 8. The data store(s) 908 may include file systems, data tables, documents, databases, or other organized collections of data.

The data store(s) 908 may be included in the computing system 900 or in another computing system and/or storage system distinct from but coupled to or accessible by the computing system 900. The data store(s) 908 can include one or more non-transitory computer-readable mediums for storing the data. In some implementations, the data store(s) 908 may be incorporated with the memory 906 or may be distinct therefrom. In some implementations, the data store(s) 908 may store data associated with a database management system (DBMS) operable on the computing system 900. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   determining, by a delivery coordination engine, a delivery entry representing a future delivery in a set of delivery entries representing a set of deliveries assigned to a delivery vehicle, the future delivery entry including a first item;
   determining, by the delivery coordination engine, a storage location of the first item in the delivery vehicle;
   determining, by the delivery coordination engine, an area of a route of the delivery vehicle in which to dynamically secure an automated guided vehicle (AGV) to the delivery vehicle;
   during transit of the delivery vehicle along the route for delivering the set of deliveries to one or more geographic locations external to a warehouse, navigating, within the delivery vehicle, the AGV to a point proximate to the storage location of the first item in the delivery vehicle, and retrieving, by the AGV, the first item from the storage location in the delivery vehicle, the AGV moving the first item within the delivery vehicle based on a position of the future delivery entry among a sequence of the set of delivery entries;
   automatically securing the AGV to the delivery vehicle based on the determined area; and
   delivering, by the AGV, the first item to a delivery point.

2. The method of claim 1, comprising securing the AGV using a stabilizing mechanism of the delivery vehicle, the stabilizing mechanism being adapted to impede movement of the AGV within the delivery vehicle.

3. The method of claim 2, wherein securing the AGV includes using a stabilizing mechanism interface of the AGV to interact with the stabilizing mechanism of the delivery vehicle to stabilize the AGV during acceleration of the delivery vehicle.

4. The method of claim 2, wherein securing the AGV is performed in response to a defined trigger, the defined trigger including one or more of a threshold acceleration of the delivery vehicle, a threshold velocity of the delivery vehicle, and entrance of the delivery vehicle into a geographic area.

5. The method of claim 1, wherein retrieving the first item from the storage location in the delivery vehicle includes actuating a mechanism coupled with a shelf in the delivery vehicle to transport the first item toward an item handling mechanism of the AGV.

6. The method of claim 1, comprising:
   determining that a second storage location of a second item is in front of the storage location of the first item on a shelf of the delivery vehicle; and
   in response to determining that the second storage location is in front of the storage location of the first item, transporting, by the AGV, the second item to a third storage location.

7. The method of claim 6, comprising:
   determining the sequence of the set of entries representing the set of deliveries assigned to the delivery vehicle; and
   determining the third storage location based on the sequence of the set of entries, the third storage location satisfying a constraint that the third storage location is not in front of a prior-delivery storage location in the delivery vehicle, the prior-delivery storage location including a location of a prior-delivery item in the sequence of the set of entries, the prior-delivery item being delivered earlier in the sequence of the set of entries than the second item.

8. The method of claim 1, wherein delivering the first item to the delivery point includes
   determining a delivery door from a plurality of doors of the delivery vehicle based on the delivery door being associated with the delivery entry representing the future delivery, the delivery door being determined based on attributes of the future delivery stored in a database accessible to the delivery coordination engine, and
   navigating the AGV to the delivery point using the delivery door.

9. The method of claim 1, wherein delivering the first item to the delivery point includes navigating the AGV from inside of the delivery vehicle to the delivery point, the delivery point being located outside of the delivery vehicle, the AGV being configured to travel into and out of the delivery vehicle.

10. The method of claim 1, wherein determining the delivery entry representing the future delivery in the set of delivery entries assigned to the delivery vehicle includes
    receiving location data from a computing system of the delivery vehicle, and
    determining, based on the location data, the delivery entry representing the future delivery from the set of delivery entries based on the delivery vehicle being within a defined threshold distance from a location of the future delivery.

11. An automated guided vehicle ("AGV") comprising:
    a body;
    a drive unit coupled with the body and providing motive force to the body;
    a guidance system locating the AGV in a delivery vehicle, the guidance system providing location data to a controller of the AGV;
    an item handling mechanism (IHM) coupled with the body, the IHM adapted to move one or more items; and
    the controller coupled with the drive unit, the guidance system, and the item handling mechanism, the controller causing the AGV to perform operations including:
      determining a storage location in the delivery vehicle of a first item;
      determining an area of a route of the delivery vehicle in which to dynamically secure the AGV to the delivery vehicle;
      during transit of the delivery vehicle along a route for delivering a set of deliveries to one or more geographic locations external to a warehouse, navigating, within the delivery vehicle, to a point proximate to the storage location of the first item in the delivery vehicle using the drive unit and the guidance system, and retrieving, by the AGV, the first item from the storage location in the delivery vehicle using the IHM;
      automatically securing the AGV to the delivery vehicle based on the determined area; and
      delivering, by the AGV, the first item to a delivery point.

12. The AGV of claim 11, wherein the AGV includes a stabilizing mechanism interface configured to interact with a stabilizing mechanism of the delivery vehicle to stabilize the AGV during acceleration of the delivery vehicle.

13. The AGV of claim 11, wherein the AGV includes an output device, the output device causing an item moving mechanism of a shelf to transport items between the storage location of the first item toward the IHM of the AGV.

14. The AGV of claim 11, wherein the IHM includes a carrying device that receives the first item from the storage location on a shelf in the delivery vehicle.

15. The AGV of claim 11, wherein the controller causes the AGV to stabilize itself using a stabilizing mechanism of the delivery vehicle in response to the controller detecting a threshold velocity of the delivery vehicle.

16. A system comprising:
an automated guided vehicle ("AGV");
a delivery vehicle; and
a computing system including one or more processors and a memory storing instructions that, when executed by the one or more processors, cause the system to:
determine a delivery entry representing a future delivery in a set of delivery entries representing a set of deliveries assigned to the delivery vehicle, the future delivery entry including a first item;
determine a storage location of the first item in the delivery vehicle;
determine an area of a route of the delivery vehicle in which to dynamically secure an automated guided vehicle (AGV) to the delivery vehicle;
during transit of the delivery vehicle along a route for delivering the set of deliveries to one or more geographic locations external to a warehouse, navigate, within the delivery vehicle, the AGV to a point proximate to the storage location of the first item in the delivery vehicle, retrieve, by the AGV, the first item from the storage location in the delivery vehicle, and automatically secure the AGV to the delivery vehicle based on the determined area;
automatically secure the AGV to the delivery vehicle based on the determined area; and
deliver, by the AGV, the first item to a delivery point.

17. The system of claim 16, comprising securing the AGV using a stabilizing mechanism of the delivery vehicle, the stabilizing mechanism being adapted to impede movement of the AGV within the delivery vehicle.

18. The system of claim 17, wherein securing the AGV includes using a stabilizing mechanism interface of the AGV to interact with the stabilizing mechanism of the delivery vehicle to stabilize the AGV during acceleration of the delivery vehicle.

19. The system of claim 17, wherein securing the AGV is performed in response to a defined trigger, the defined trigger including one or more of a threshold acceleration of the delivery vehicle, a threshold velocity of the delivery vehicle, and entrance of the delivery vehicle into a geographic area.

20. The system of claim 16, wherein retrieving the first item from the storage location in the delivery vehicle includes actuating a mechanism coupled with a shelf in the delivery vehicle to transport the first item toward an item handling mechanism of the AGV.

21. The system of claim 16, comprising:
determining that a second storage location of a second item is in front of the storage location of the first item on a shelf of the delivery vehicle; and
in response to determining that the second storage location is in front of the storage location of the first item, transporting, by the AGV, the second item to a third storage location.

22. The system of claim 21, comprising:
determining a sequence of the set of entries representing the set of deliveries assigned to the delivery vehicle; and
determining the third storage location based on the sequence of the set of entries, the third storage location satisfying a constraint that the third storage location is not in front of a prior-delivery storage location in the delivery vehicle, the prior-delivery storage location being a location of a prior-delivery item, the prior-delivery item being delivered earlier in the sequence of the set of entries than the second item.

23. The system of claim 16, wherein delivering the first item to the delivery point includes
determining a delivery door from a plurality of doors of the delivery vehicle based on an association of the delivery door with the delivery entry representing the future delivery based on attributes of the future delivery stored in a database accessible to the computing system, and
navigating the AGV to the delivery point using the delivery door.

24. The system of claim 16, wherein delivering the first item to the delivery point includes navigating the AGV from inside of the delivery vehicle to the delivery point, the delivery point being located outside of the delivery vehicle, the AGV being configured to travel into and out of the delivery vehicle.

25. The system of claim 16, wherein determining the delivery entry representing the future delivery in the set of delivery entries representing the set of deliveries assigned to the delivery vehicle includes
receiving location data from the delivery vehicle, and
determining, based on the location data, the delivery entry representing the future delivery from the set of delivery entries based on the delivery vehicle being within a defined threshold distance from a location of the future delivery.

* * * * *